(12) United States Patent
Johnson et al.

(10) Patent No.: US 11,967,231 B2
(45) Date of Patent: *Apr. 23, 2024

(54) MICROMOBILITY TRANSIT VEHICLE COCKPIT ASSEMBLIES WITH CAMERAS

(71) Applicant: Lyft, Inc., San Francisco, CA (US)

(72) Inventors: Kelly Erin Johnson, Oakland, CA (US); Christopher Paul Merrill, San Francisco, CA (US); Jens Paul Windau, San Francisco, CA (US); Edgar-Alison Vasquez Japitana, So. San Francisco, CA (US); Garrett Korda Drayna, San Carlos, CA (US)

(73) Assignee: Lyft, Inc., San Francisco, CA (US)

( * ) Notice: Subject to any disclaimer, the term of this patent is extended or adjusted under 35 U.S.C. 154(b) by 708 days.

This patent is subject to a terminal disclaimer.

(21) Appl. No.: 16/909,765

(22) Filed: Jun. 23, 2020

(65) Prior Publication Data

US 2021/0192229 A1 Jun. 24, 2021

Related U.S. Application Data

(63) Continuation-in-part of application No. 16/729,070, filed on Dec. 27, 2019, now Pat. No. 10,800,475, (Continued)

(51) Int. Cl.
*G06V 20/56* (2022.01)
*G06T 7/73* (2017.01)
(Continued)

(52) U.S. Cl.
CPC .......... *G08G 1/096811* (2013.01); *G06T 7/73* (2017.01); *G08G 1/20* (2013.01); *G06V 20/56* (2022.01)

(58) Field of Classification Search
CPC ... G06T 7/73; G08G 1/20; G06V 20/56; B62J 6/00; B62J 6/02; B62J 6/022; B62J 11/00
See application file for complete search history.

(56) References Cited

U.S. PATENT DOCUMENTS 7,070,295 B1 7/2006 Lee
10,245,937 B2 4/2019 Gillett
(Continued)

FOREIGN PATENT DOCUMENTS

EP 3409570 12/2018
KR 2011/0056262 3/2016
WO WO 2017/123158 7/2017

*Primary Examiner* — Tony H Winner
(74) *Attorney, Agent, or Firm* — Baker Botts L.L.P.

(57) ABSTRACT

A cockpit for a micromobility transit vehicle may include a camera and a cockpit housing. The cockpit housing may be configured to couple to a handlebar of the micromobility transit vehicle. The cockpit housing may include a first portion and a second portion where the second portion extends from the first portion. The first portion of the cockpit housing may include a surface configured to wrap at least partially around the handlebar. The second portion of the cockpit housing may be configured to secure the camera disposed therein such that the camera is oriented to have a field of view in front of the micromobility transit vehicle. The camera may be disposed in the second portion and configured to capture a scene in the field of view in front of the micromobility transit vehicle. Related systems and methods are additionally disclosed.

20 Claims, 30 Drawing Sheets

Related U.S. Application Data which is a continuation-in-part of application No. 16/726,156, filed on Dec. 23, 2019.

(51) Int. Cl.
  *G08G 1/00* (2006.01)
  *G08G 1/0968* (2006.01)

(56) References Cited

U.S. PATENT DOCUMENTS

| | | |
|---|---|---|
| 10,858,061 B2 * | 12/2020 | Montez .................... B62J 50/22 |
| 2005/0180150 A1 | 8/2005 | Okada |
| 2015/0210334 A1 | 7/2015 | Armstrong |
| 2016/0059920 A1 | 3/2016 | Takanashi et al. |
| 2016/0107517 A1 | 4/2016 | Larray |
| 2016/0129962 A1 | 5/2016 | Langevin |
| 2016/0200383 A1 | 7/2016 | McAleese |
| 2017/0284433 A1 | 10/2017 | Thomas |
| 2018/0072377 A1 | 3/2018 | Kishita |
| 2018/0334216 A1 | 11/2018 | Montez |
| 2019/0071143 A1 | 3/2019 | Wu |
| 2019/0084640 A1 | 3/2019 | Eguchi |
| 2019/0144068 A1 | 5/2019 | David |
| 2019/0250619 A1 | 8/2019 | Gillett |
| 2021/0396538 A1 * | 12/2021 | Cun ....................... B62K 3/002 |

\* cited by examiner

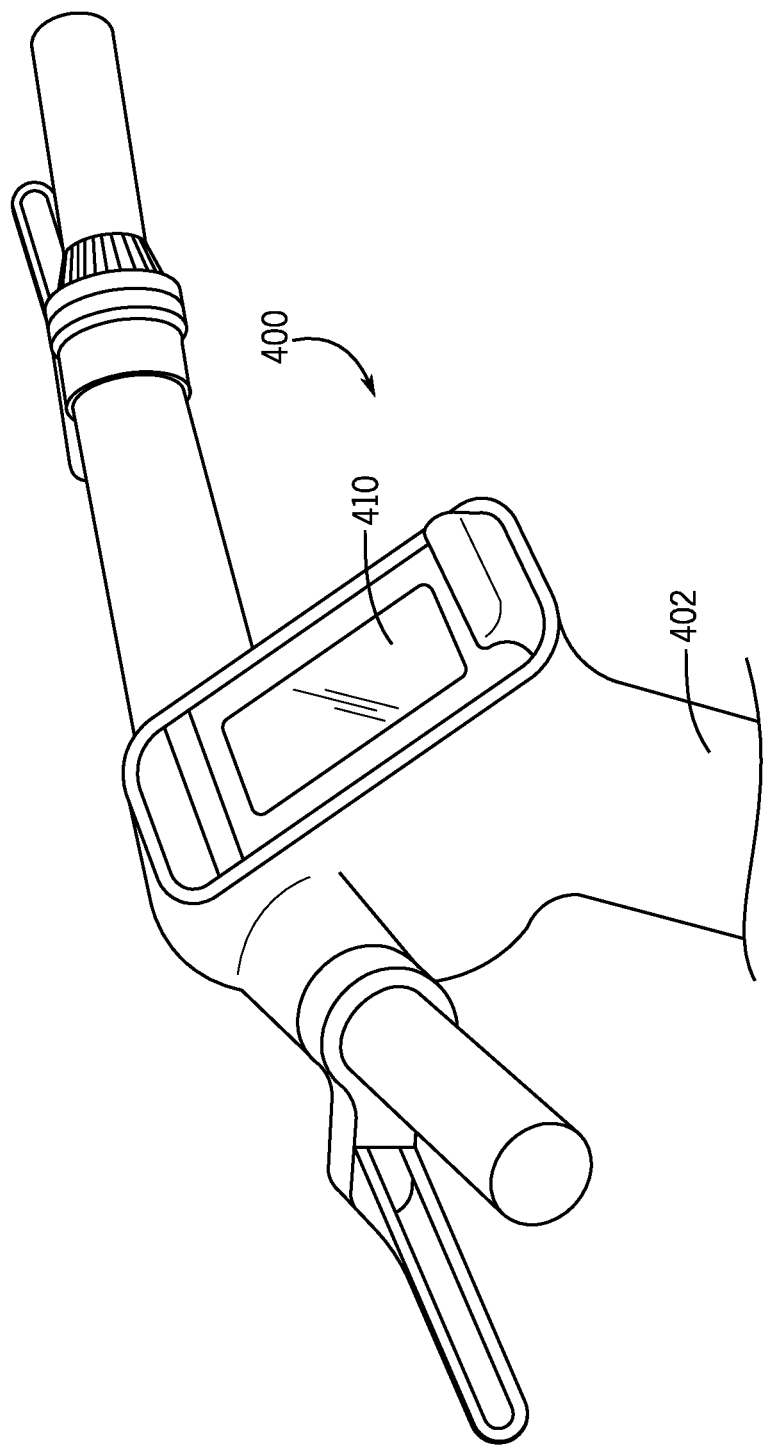

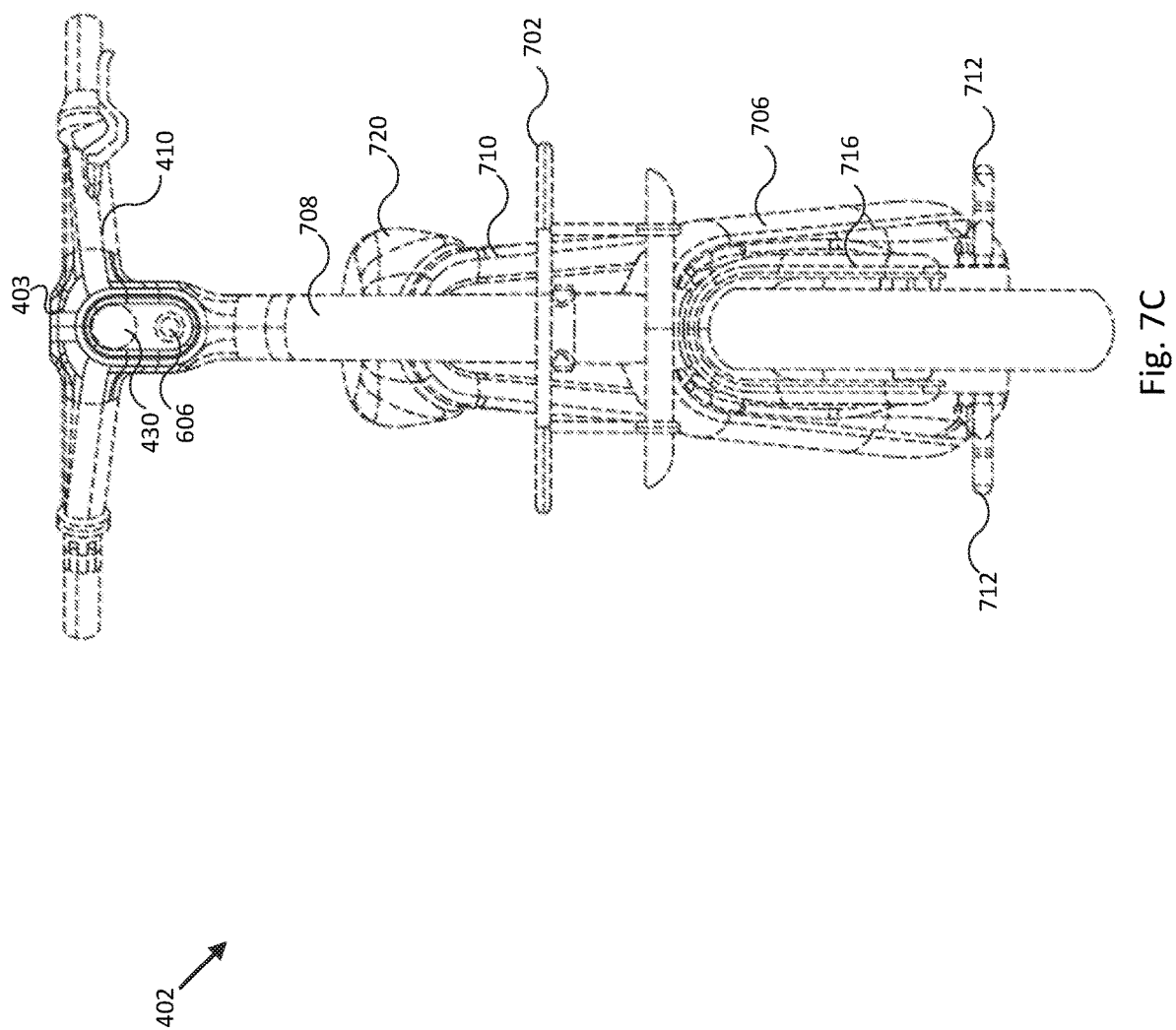

MICROMOBILITY TRANSIT VEHICLE COCKPIT ASSEMBLIES WITH CAMERAS

CROSS REFERENCED TO RELATED APPLICATIONS

This application claims priority to and is a continuation-in-part of U.S. patent application Ser. No. 16/726,156, filed on Dec. 23, 2019, entitled "CAMERA-SENSOR FUSION MODULE FOR SURFACE DETECTION AND FLEET VEHICLE CONTROL SYSTEMS AND METHODS", and U.S. patent application Ser. No. 16/729,070, filed on Dec. 27, 2019, entitled "MICRO-MOBILITY FLEET VEHICLE COCKPIT ASSEMBLY SYSTEMS AND METHODS", the contents of which are incorporated herein by reference in their entirety.

TECHNICAL FIELD

One or more embodiments of the present disclosure relate generally to micromobility transit vehicles and more particularly, for example, to systems and methods for a cockpit assembly including a camera for a micromobility transit vehicle.

BACKGROUND

Contemporary transportation services may incorporate a variety of different types of vehicles, including motorized or electric scooters and bicycles designed to transport one or two people at once (collectively, micromobility transit vehicles). Such micromobility transit vehicles provide an additional dimension of transportation flexibility, particularly when such vehicles are incorporated into a dynamic transportation matching system that links requestors or users to transit vehicles for use. Servicing a relatively extensive fleet of micromobility transit vehicles can present significant and cumbersome capital investment and labor (e.g., time and cost) burden to a fleet manager/servicer. As such, there is a need in the art for systems and methods related to a cockpit assembly of a micromobility transit vehicle where the cockpit assembly incorporates desired components into a seamless design that is convenient to service.

SUMMARY

Techniques are disclosed for systems and methods associated with a cockpit assembly for a micromobility transit vehicle. In accordance with one or more embodiments, the cockpit assembly may include a camera configured to capture a field of view in front of the micromobility transit vehicle. The cockpit assembly may further include a cockpit housing coupled to a handlebar of the micromobility transit vehicle, where the cockpit housing has a first portion and a second portion extending from the first portion. The first portion may have a surface configured to wrap or interface at least partially about a central stem of the handlebar. The camera may be disposed inside the second portion and the second portion may be configured to orient the camera disposed therein to have the field of view in front of the micromobility transit vehicle.

In accordance with one or more embodiments, a micromobility transit vehicle may include a handlebar assembly and a cockpit housing coupled to the handlebar assembly. The cockpit housing may include a first portion and a second portion extending from the first portion. The first portion may have a surface configured to wrap or interface at least partially around a central stem of the handlebar. The micromobility vehicle may include a camera disposed inside the second portion and the second portion may be configured to orient the camera to have a field of view in front of the micromobility transit vehicle.

In accordance with one or more embodiments, a method may include placing a camera in a cockpit housing such that the camera is oriented to have a field of view in front of a micromobility transit vehicle when the cockpit housing is attached to a handlebar of the micromobility transit vehicle. The method may further include attaching the cockpit housing to the handlebar of the micromobility transit vehicle.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments of the invention. Reference will be made to the appended sheets of drawings that will first be described briefly.

BRIEF DESCRIPTION OF THE DRAWINGS

FIG. 4 illustrates a diagram of a user interface associated with a micromobility transit vehicle in accordance with an embodiment of the disclosure.

FIGS. 7A-7I illustrate views of a micromobility transit vehicle in accordance with one or more embodiments of the present disclosure.

Embodiments of the invention and their advantages are best understood by referring to the detailed description that follows. It should be appreciated that like reference numerals are used to identify like elements illustrated in one or more of the figures.

DETAILED DESCRIPTION

Figure 1:
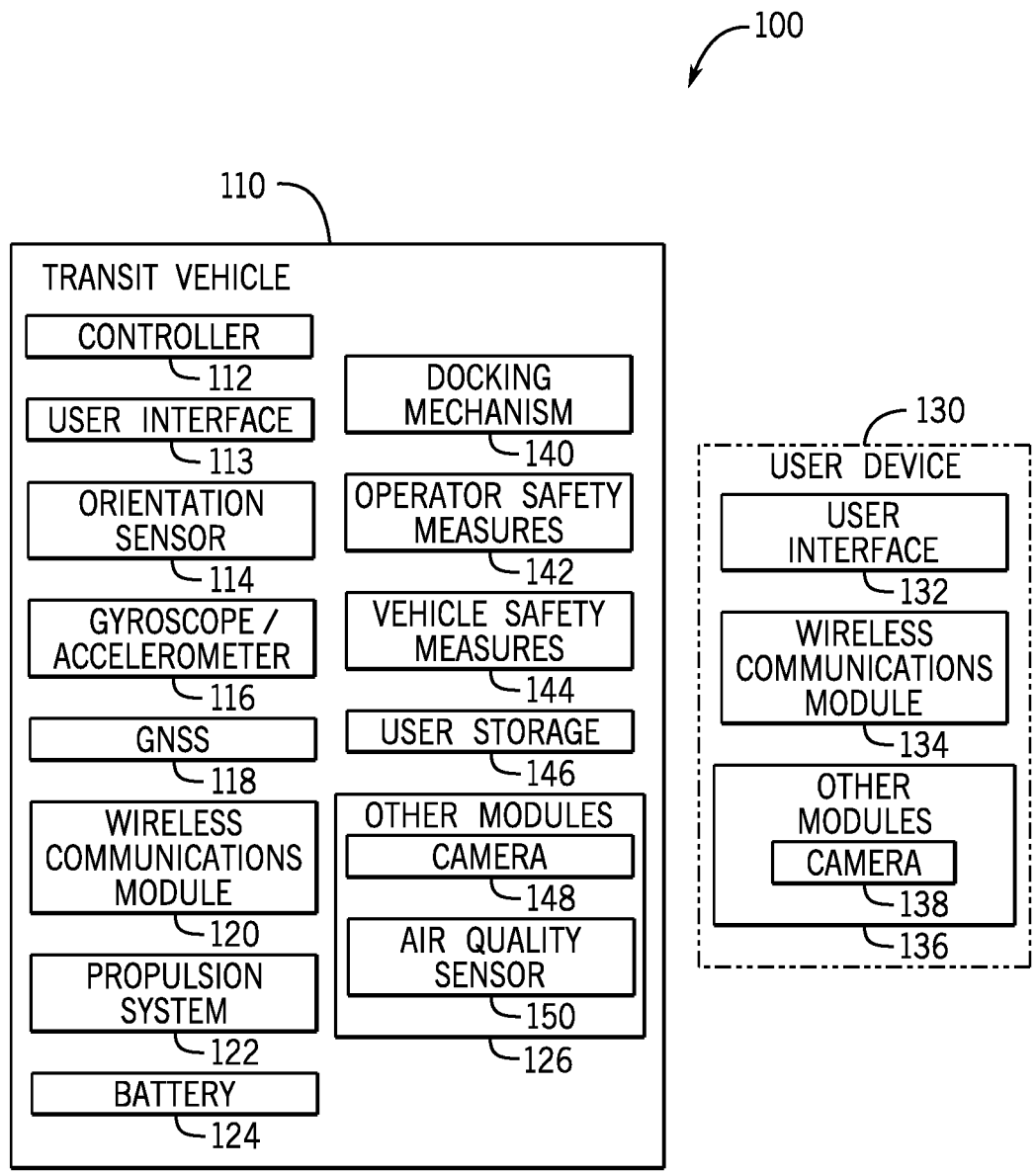
FIG. 1 illustrates a block diagram of a portion of a dynamic transportation matching system including a transit vehicle in accordance with an embodiment of the disclosure.

In accordance with various embodiments of the present disclosure, sit-scooters, scooters, bicycles, and other micromobility transit vehicles benefit from a functional, intuitive, and distinctive cockpit assembly that includes one or more cameras configured to capture a field of view in front of the micromobility transit vehicle. The cockpit assembly may further include a cockpit housing coupled to a handlebar of the micromobility transit vehicle, where the cockpit housing has a first portion and a second portion extending from the first portion. The first portion may have a surface configured to wrap or interface at least partially around a central stem of the handlebar. The camera may be disposed inside the second portion and the second portion may be configured to orient the camera disposed therein to have the field of view in front of the micromobility transit vehicle.

In some embodiments, the second portion of the cockpit housing may include a camera window disposed at an end of the second portion. The second portion may further include a boot disposed therein and configured to align the camera with the camera window to capture the field of view in front of the micromobility transit vehicle in some implementations. In some cases, the boot may dampen shock and/or vibration of the camera as the micromobility transit vehicle moves about an environment. Further, in some embodiments, the camera window may include a surface coating disposed thereon and configured to repel environmental debris from the camera window. In various embodiments, the cockpit assembly may include a headlight configured to illuminate the field of view in front of the micromobility transit vehicle and the boot may be configured to align the field of view of the camera with the illumination provided by the headlight.

In some embodiments, the cockpit assembly may include a stress sensor coupled to the camera and configured to measure vibration experienced by the camera. A controller and/or logic device disposed in the cockpit assembly and coupled to the stress sensor may be used to track a number of stress cycles for the camera based on the vibration measured by the stress sensor. In some cases, the camera may have a maintenance schedule based on the stress cycles for the camera. For example, after a certain number of stress cycles have been determined for the camera, the controller may provide a notification to a user that the camera should be serviced.

In accordance with one or more embodiments, a method for assembling the cockpit assembly may include placing the camera in the cockpit housing such that the camera is oriented to have a field of view in front of a micromobility transit vehicle when the cockpit housing is attached to a handlebar of the micromobility transit vehicle. The method may further include attaching the cockpit housing to the handlebar of the micromobility transit vehicle. Additional aspects as well as systems and methods related to cockpit assemblies including cameras will further be discussed below.

FIG. 1 illustrates a block diagram of a portion of a dynamic transportation matching system 100 (e.g., system 100) including a transit vehicle 110 in accordance with an embodiment of the disclosure. In the embodiment shown in FIG. 1, system 100 includes transit vehicle 110 and optionally a user device 130. In general, transit vehicle 110 may be a passenger vehicle designed to transport a single person (e.g., a micromobility transit vehicle, a transit bike and scooter vehicle, or the like) or a group of people (e.g., a typical car or truck). More specifically, transit vehicle 110 may be implemented as a motorized or electric kick scooter, bicycle, and/or motor scooter designed to transport one or perhaps two people at once typically on a paved road (collectively, micromobility transit vehicles), as a typical automobile configured to transport up to 4, 7, or 10 people at once, or according to a variety of different transportation modalities (e.g., transportation mechanisms). Transit vehicles similar to transit vehicle 110 may be owned, managed, and/or serviced primarily by a fleet manager/servicer providing transit vehicle 110 for use by the public as one or more types of transportation modalities offered by a dynamic transportation matching system, for example. In some embodiments, transit vehicles similar to transit vehicle 110 may be owned, managed, and/or serviced by a private owner using the dynamic transportation matching system to match their vehicle to a transportation request, such as with ridesharing or ridesourcing applications typically executed on a mobile user device, such as user device 130 as described herein. User device 130 may be a smartphone, tablet, near field communication (NFC) or radio-frequency identification (RFID) enabled smart card, or other personal or portable computing and/or communication device that may be used to facilitate rental and/or operation of transit vehicle 110.

As shown in FIG. 1, transit vehicle 110 may include one or more of a controller 112, a user interface 113, an orientation sensor 114, a gyroscope/accelerometer 116, a global navigation satellite system (GNSS) receiver 118, a wireless communications module 120, a camera 148, a propulsion system 122, an air quality sensor 150, and other modules 126. Operation of transit vehicle 110 may be substantially manual, autonomous, and/or partially or completely controlled by user device 130, which may include one or more of a user interface 132, a wireless communications module 134, a camera 138, and other modules 136. In other embodiments, transit vehicle 110 may include any one or more of the elements of user device 130. In some embodiments, one or more of the elements of system 100 may be implemented in a combined housing or structure that can be coupled to or within transit vehicle 110 and/or held or carried by a user of system 100.

Controller 112 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of transit vehicle 110 and/or other elements of system 100, for example. Such software instructions may also implement methods for processing images such as those provided by camera 148, and/or other sensor signals or data, determining sensor information, providing user feedback (e.g., through user interface 113 or 132), querying devices for operational parameters, selecting operational parameters for devices, or performing any of the various operations described herein (e.g., operations performed by logic devices of various devices of system 100).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user via user interface 113 or 132. In some embodiments, controller 112 may be integrated with one or more other elements of transit vehicle 110, for example, or distributed as multiple logic devices within transit vehicle 110 and/or user device 130.

In some embodiments, controller 112 may be configured to substantially continuously monitor and/or store the status of and/or sensor data provided by one or more elements of transit vehicle 110 and/or user device 130, such as the position and/or orientation of transit vehicle 110 and/or user device 130, for example, and the status of a communication link established between transit vehicle 110 and/or user device 130. Such communication links may be established and then provide for transmission of data between elements of system 100 substantially continuously throughout operation of system 100, where such data includes various types of sensor data, control parameters, and/or other data.

User interface 113 of transit vehicle 110 may be implemented as one or more of a display, a touch screen, a keyboard, a mouse, a joystick, a knob, a steering wheel, a yoke, and/or any other device capable of accepting user input and/or providing feedback to a user. In various embodiments, user interface 113 may be adapted to provide user input (e.g., as a type of signal and/or sensor information transmitted by wireless communications module 134 of user device 130) to other devices of system 100, such as controller 112. User interface 113 may also be implemented with one or more logic devices (e.g., similar to controller 112) that may be adapted to store and/or execute instructions, such as software instructions, implementing any of the various processes and/or methods described herein. For example, user interface 113 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 113 may be adapted to display a time series of various sensor information and/or other parameters as part of or overlaid on a graph or map, which may be referenced to a position and/or orientation of transit vehicle 110 and/or other elements of system 100. For example, user interface 113 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 113 may be adapted to accept user input including a user-defined target heading, waypoint, route, and/or orientation, for example, and to generate control signals to cause transit vehicle 110 to move according to the target heading, route, and/or orientation. In other embodiments, user interface 113 may be adapted to accept user input modifying a control loop parameter of controller 112, for example.

Orientation sensor 114 may be implemented as one or more of a compass, float, accelerometer, and/or other device capable of measuring an orientation of transit vehicle 110 (e.g., magnitude and direction of roll, pitch, and/or yaw, relative to one or more reference orientations such as gravity and/or Magnetic North), camera 148, and/or other elements of system 100, and providing such measurements as sensor signals and/or data that may be communicated to various devices of system 100. Gyroscope/accelerometer 116 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of transit vehicle 110 and/or other elements of system 100 and providing such measurements as sensor signals and/or data that may be communicated to other devices of system 100 (e.g., user interface 132, controller 112).

GNSS receiver 118 may be implemented according to any global navigation satellite system, including a GPS, GLONASS, and/or Galileo based receiver and/or other device capable of determining absolute and/or relative position of transit vehicle 110 (e.g., or an element of transit vehicle 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, GNSS receiver 118 may include an altimeter, for example, or may be used to provide an absolute altitude.

Wireless communications module 120 may be implemented as any wireless communications module configured to transmit and receive analog and/or digital signals between elements of system 100. For example, wireless communications module 120 may be configured to directly or indirectly receive control signals and/or data from user device 130 and provide them to controller 112 and/or propulsion system 122. In other embodiments, wireless communications module 120 may be configured to receive images and/or other sensor information (e.g., still images or video images) and relay the sensor data to controller 112 and/or user device 130. In some embodiments, wireless communications module 120 may be configured to support spread spectrum transmissions, for example, and/or multiple simultaneous communications channels between elements of system 100. Wireless communication links formed by wireless communications module 120 may include one or more analog and/or digital radio communication links, such as WiFi, Bluetooth, NFC, RFID, LTE, and others, as described herein, and may be direct communication links established between elements of system 100, for example, or may be relayed through one or more wireless relay stations configured to receive and retransmit wireless communications. In various embodiments, wireless communications module 120 may be configured to support wireless mesh networking, as described herein.

In some embodiments, wireless communications module 120 may be configured to be physically coupled to transit vehicle 110 and to monitor the status of a communication link directly or indirectly established between transit vehicle 110 and/or user device 130. Such status information may be provided to controller 112, for example, or transmitted to other elements of system 100 for monitoring, storage, or further processing, as described herein. In addition, wireless communications module 120 may be configured to determine a range to another device, such as based on time of flight, and provide such range to the other device and/or controller 112. Communication links established by communication module 120 may be configured to transmit data between elements of system 100 substantially continuously throughout operation of system 100, where such data includes various types of sensor data, control parameters, and/or other data, as described herein.

Propulsion system 122 may be implemented as one or more motor-based propulsion systems, and/or other types of propulsion systems that can be used to provide motive force to transit vehicle 110 and/or to steer transit vehicle 110. In some embodiments, propulsion system 122 may include elements that can be controlled (e.g., by controller 112 and/or user interface 113) to provide motion for transit vehicle 110 and to provide an orientation for transit vehicle 110. In various embodiments, propulsion system 122 may be implemented with a portable power supply, such as a battery. In some embodiments, propulsion system 122 may be implemented with a combustion engine/generator and fuel supply.

For example, in some embodiments, such as when propulsion system 122 is implemented by an electric motor (e.g., as with many micromobility transit vehicles), transit vehicle 110 may include battery 124. Battery 124 may be implemented by one or more battery cells (e.g., lithium ion battery cells) and be configured to provide electrical power to propulsion system 122 to propel transit vehicle 110, for example, as well as to various other elements of system 100, including controller 112, user interface 113, and/or wireless communications module 120. In some embodiments, battery 124 may be implemented with its own safety measures, such as thermal interlocks and a fire-resistant enclosure, for example, and may include one or more logic devices, sensors, and/or a display to monitor and provide visual feedback of a charge status of battery 124 (e.g., a charge percentage, a low charge indicator, etc.).

Other modules 126 may include other and/or additional sensors, actuators, communications modules/nodes, and/or user interface devices, for example, and may be used to provide additional environmental information related to operation of transit vehicle 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), and/or other environmental sensors providing measurements and/or other sensor signals that can be displayed to a user and/or used by other devices of system 100 (e.g., controller 112) to provide operational control of transit vehicle 110 and/or system 100. In further embodiments, other modules 126 may include a light, such as a headlight or indicator light, and/or an audible alarm, both of which may be activated to alert passersby to possible theft, abandonment, and/or other critical statuses of transit vehicle 110. In particular, and as shown in FIG. 1, other modules 126 may include camera 148 and/or air quality sensor 150.

Camera 148 may be implemented as an imaging device including an imaging module including an array of detector elements that can be arranged in a focal plane array. In various embodiments, camera 148 may include one or more logic devices (e.g., similar to controller 112) that can be configured to process imagery captured by detector elements of camera 148 before providing the imagery to communications module 120 or other elements of the system 100. More generally, camera 148 may be configured to perform any of the operations or methods described herein, at least in part, or in combination with controller 112 and/or user interface 113 or 132. In some embodiments, camera 148 may be a visible light imager and/or thermal imager.

In various embodiments, air quality sensor 150 may be implemented as an air sampling sensor configured to determine an air quality of an environment about transit vehicle 110 and provide corresponding air quality sensor data. Air quality sensor data provided by air quality sensor 150 may include particulate count, methane content, ozone content, and/or other air quality sensor data associated with common street level sensitivities and/or health monitoring typical when in a street level environment, such as that experienced when riding on a typical micromobility transit vehicle, as described herein.

Transit vehicles implemented as micromobility transit vehicles may include a variety of additional features designed to facilitate fleet management and user and environmental safety. For example, as shown in FIG. 1, transit vehicle 110 may include one or more of docking mechanism 140, operator safety measures 142, vehicle security device 144, and/or user storage 146, as described in more detail herein by reference to FIGS. 3A-C.

User interface 132 of user device 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by wireless communications module 134 of user device 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In one embodiment, user interface 132 may be adapted to display a time series of various sensor information and/or other parameters as part of or overlaid on a graph or map, which may be referenced to a position and/or orientation of transit vehicle 110 and/or other elements of system 100. For example, user interface 132 may be adapted to display a time series of positions, headings, and/or orientations of transit vehicle 110 and/or other elements of system 100 overlaid on a geographical map, which may include one or more graphs indicating a corresponding time series of actuator control signals, sensor information, and/or other sensor and/or control signals. In some embodiments, user interface 132 may be adapted to accept user input including a user-defined target heading, waypoint, route, and/or orientation, for example, and to generate control signals to cause transit vehicle 110 to move according to the target heading, route, and/or orientation. In other embodiments, user interface 132 may be adapted to accept user input modifying a control loop parameter of controller 112, for example.

Wireless communications module 134 may be implemented as any wireless communications module configured to transmit and receive analog and/or digital signals between elements of system 100. For example, wireless communications module 134 may be configured to directly or indirectly transmit control signals from user interface 132 to wireless communications module 120 or 134. In some embodiments, wireless communications module 134 may be configured to support spread spectrum transmissions, for example, and/or multiple simultaneous communications channels between elements of system 100. In various embodiments, wireless communications module 134 may be configured to monitor the status of a communication link established between user device 130 and/or transit vehicle 110 (e.g., including packet loss of transmitted and received data between elements of system 100, such as with digital communication links), and/or determine a range to another device, as described herein. Such status information may be provided to user interface 132, for example, or transmitted to other elements of system 100 for monitoring, storage, or further processing, as described herein. In various embodiments, wireless communications module 134 may be configured to support wireless mesh networking, as described herein.

Other modules 136 of user device 130 may include other and/or additional sensors, actuators, communications modules/nodes, and/or user interface devices used to provide additional environmental information associated with user device 130, for example. In some embodiments, other modules 136 may include a humidity sensor, a wind and/or water temperature sensor, a barometer, a radar system, a visible spectrum camera, an infrared camera, a GNSS receiver, and/or other environmental sensors providing measurements and/or other sensor signals that can be displayed to a user and/or used by other devices of system 100 (e.g., controller 112) to provide operational control of transit vehicle 110 and/or system 100 or to process sensor data to compensate for environmental conditions. As shown in FIG. 1, other modules 136 may include camera 138.

Camera 138 may be implemented as an imaging device including an imaging module including an array of detector elements that can be arranged in a focal plane array. In various embodiments, camera 138 may include one or more logic devices (e.g., similar to controller 112) that can be configured to process imagery captured by detector elements of camera 138 before providing the imagery to communications module 120. More generally, camera 138 may be configured to perform any of the operations or methods described herein, at least in part, or in combination with controller 138 and/or user interface 113 or 132.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100.

In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 and/or elements of other systems similar to system 100 using a variety of wired and/or wireless communication techniques, including voltage signaling, Ethernet, WiFi, Bluetooth, Zigbee, Xbee, Micronet, Near-field Communication (NFC) or other medium and/or short range wired and/or wireless networking protocols and/or implementations, for example. In such embodiments, each element of system 100 may include one or more modules supporting wired, wireless, and/or a combination of wired and wireless communication techniques, including wireless mesh networking techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements.

Each element of system 100 may include one or more batteries, capacitors, or other electrical power storage devices, for example, and may include one or more solar cell modules or other electrical power generating devices. In some embodiments, one or more of the devices may be powered by a power source for transit vehicle 110, using one or more power leads. Such power leads may also be used to support one or more communication techniques between elements of system 100.

Figure 2:
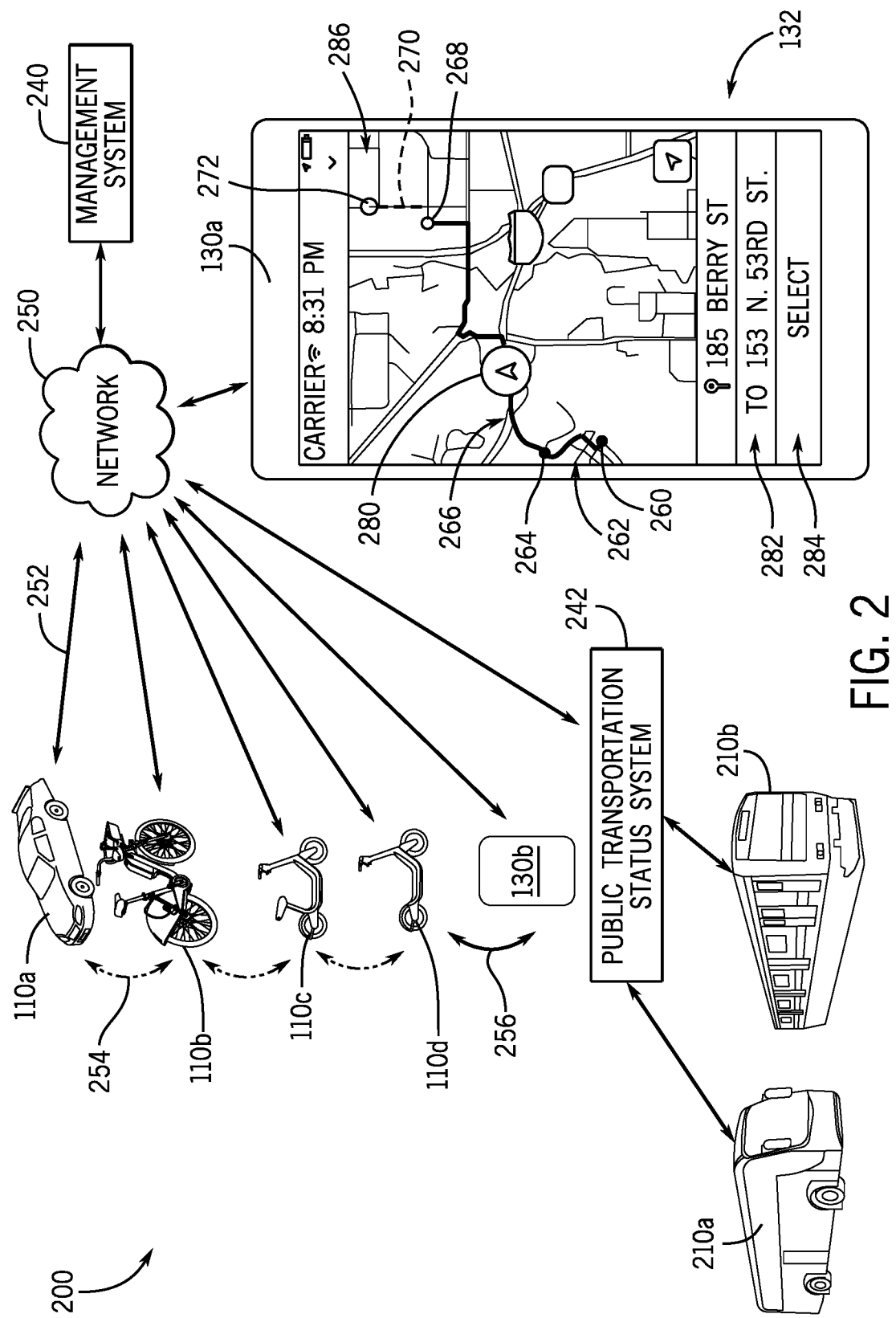
FIG. 2 illustrates a block diagram of a dynamic transportation matching system incorporating a variety of transportation modalities in accordance with an embodiment of the disclosure.

FIG. 2 illustrates a block diagram of a dynamic transportation matching system 200 (or multimodal transportation system) incorporating a variety of transportation modalities in accordance with an embodiment of the disclosure. For example, as shown in FIG. 2, dynamic transportation matching system 200 may include multiple embodiments of system 100. In the embodiment shown in FIG. 2, dynamic transportation matching system 200 includes a management system/server 240 in communication with a number of transit vehicles 110a-d and user devices 130a-b over a combination of a typical wide area network (WAN) 250, WAN communication links 252 (solid lines), a variety of mesh network communication links 254 (curved dashed lines), and NFC, RFID, and/or other local communication links 256 (curved solid lines). Dynamic transportation matching system 200 also includes a public transportation status system 242 in communication with a variety of public transportation vehicles, including one or more buses 210a, trains 210b, and/or other public transportation modalities, such as ships, ferries, light rail, subways, streetcars, trolleys, cable cars, monorails, tramways, and aircraft. As shown in FIG. 2, all transit vehicles are able to communicate directly to WAN 250 and, in some embodiments, may be able to communicate across mesh network communication links 254, to convey fleet data and/or fleet status data amongst themselves and/or to and from management system 240.

In FIG. 2, user device 130a may receive an input with a request for transportation with one or more transit vehicles 110a-d and/or public transportation vehicles 210a-b. For example, the transportation request may be a request to use (e.g., hire or rent) one of transit vehicles 110a-d. The transportation request may be transmitted to management system 240 over WAN 250, allowing management system 240 to poll status of transit vehicles 110a-d and to select one of transit vehicles 110a-d to fulfill the transportation request. Upon or after one of the transit vehicles 110a-d is selected to fulfill the transportation request, a fulfillment notice from management system 240 and/or from the selected transit vehicle 110a-d may be transmitted to the user device 130a. In some embodiments, navigation instructions to proceed to or otherwise meet with the selected transit vehicle 110a-d may be sent to the user device 130a. A similar process may occur using user device 130b, but where the transportation request enables a transit vehicle over a local communication link 256, as shown.

Management system 240 may be implemented as a server with controllers, user interfaces, communications modules, and/or other elements similar to those described with respect to system 100 of FIG. 1, but with sufficient processing and storage resources to manage operation of dynamic transportation matching system 200, including monitoring statuses of transit vehicles 110a-d, as described herein. In some embodiments, management system 240 may be implemented in a distributed fashion and include multiple separate server embodiments linked communicatively to each other direction and/or through WAN 250. WAN 250 may include one or more of the Internet, a cellular network, and/or other wired or wireless WANs. WAN communication links 252 may be wired or wireless WAN communication links, and mesh network communication links 254 may be wireless communication links between and among transit vehicles 110a-d, as described herein.

User device 130a in FIG. 2 includes a display of user interface 132 that shows a planned route for a user attempting to travel from an origination point 260 to a destination 272 using different transportation modalities (e.g., a planned multimodal route), as depicted in a route/street map 286 rendered by user interface 132. For example, management system 240 may be configured to monitor statuses of all available transportation modalities (e.g., including transit vehicles and public transportation vehicles) and provide a planned multimodal route from origination point 260 to destination 272. Such a planned multimodal route may include, for example, a walking route 262 from origination point 260 to a bus stop 264, a bus route 266 from bus stop 264 to a bus stop 268 (e.g., using one or more of transit vehicles 210a or 210b), and a micromobility route 270 (e.g., using one or more of micromobility transit vehicles 110b, 110c, or 110d) from bus stop 268 to destination 272. Also shown rendered by user interface 132 are a present location indicator 280 (indicating a present absolute position of user device 130a on street map 286), a navigation destination selector/indicator 282 (e.g., configured to allow a user to input a desired navigation destination), and a notice window 284 (e.g., used to render vehicle status data or other information, including user notices and/or alerts, as described herein). For example, a user may use navigation destination selector/indicator 282 to provide and/or change destination 272, as well as change any portion (e.g., leg, route, etc.) or modality of the multimodal route from origination point 260 to destination 272. In some embodiments, notice window 284 may display instructions for traveling to a next waypoint along the determined multimodal route (e.g., directions to walk to a bus stop, directions to ride a micromobility transit vehicle to a next stop along the route, etc.).

In various embodiments, management system 240 may be configured to provide or suggest an optimal multimodal route to a user (e.g., initially and/or while traversing a particular planned route), and a user may select or make changes to such a route through manipulation of user device 130a, as shown. For example, management system 240 may be configured to suggest a quickest route, a least expensive route, a most convenient route (to minimize modality changes or physical actions a user must take along the route), an inclement weather route (e.g., that keeps the user protected from inclement weather a maximum amount of time during route traversal), or some combination of those that is determined as best suited to the user, such as based on various user preferences. Such preferences may be based on prior use of system 200, prior user trips, a desired arrival time and/or departure time (e.g., based on user input or obtained through a user calendar or other data source), or specifically input or set by a user for the specific route, for example, or in general. In one example, origination point 260 may be extremely congested or otherwise hard to access by a ride-share transit vehicle, which could prevent or significantly increase a wait time for the user and a total trip time to arrive at destination 272. In such circumstances, a planned multimodal route may include directing the user to walk and/or take a scooter/bike to an intermediate and less congested location to meet a reserved ride-share vehicle, which would allow the user to arrive at destination 272 quicker than if the ride-share vehicle was forced to meet the user at origination point 260. It will be appreciated that numerous different transportation-relevant conditions may exist or dynamically appear or disappear along a planned route that may make it beneficial to use different modes of transportation to arrive at destination 272 efficiently, including changes in traffic congestion and/or other transportation-relevant conditions that occur mid-route, such as an accident along the planned route. Under such circumstances, management system 240 may be configured to adjust a modality or portion of the planned route dynamically in order to avoid or otherwise compensate for the changed conditions while the route is being traversed.

Figure 3A:
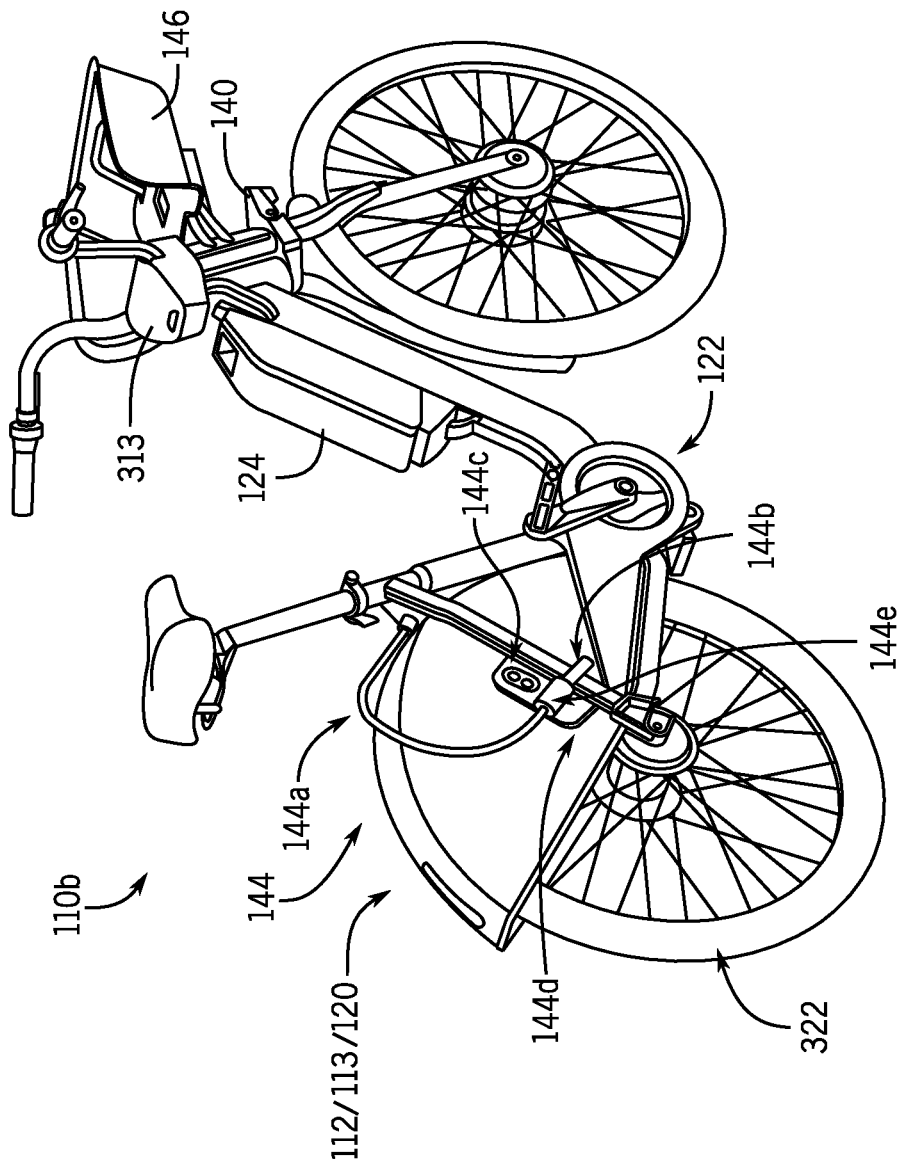
FIGS. 3A, 3B, and 3C illustrate respective diagrams of micromobility transit vehicles for use in a dynamic transportation matching system in accordance with an embodiment of the disclosure.
Figure 3B:
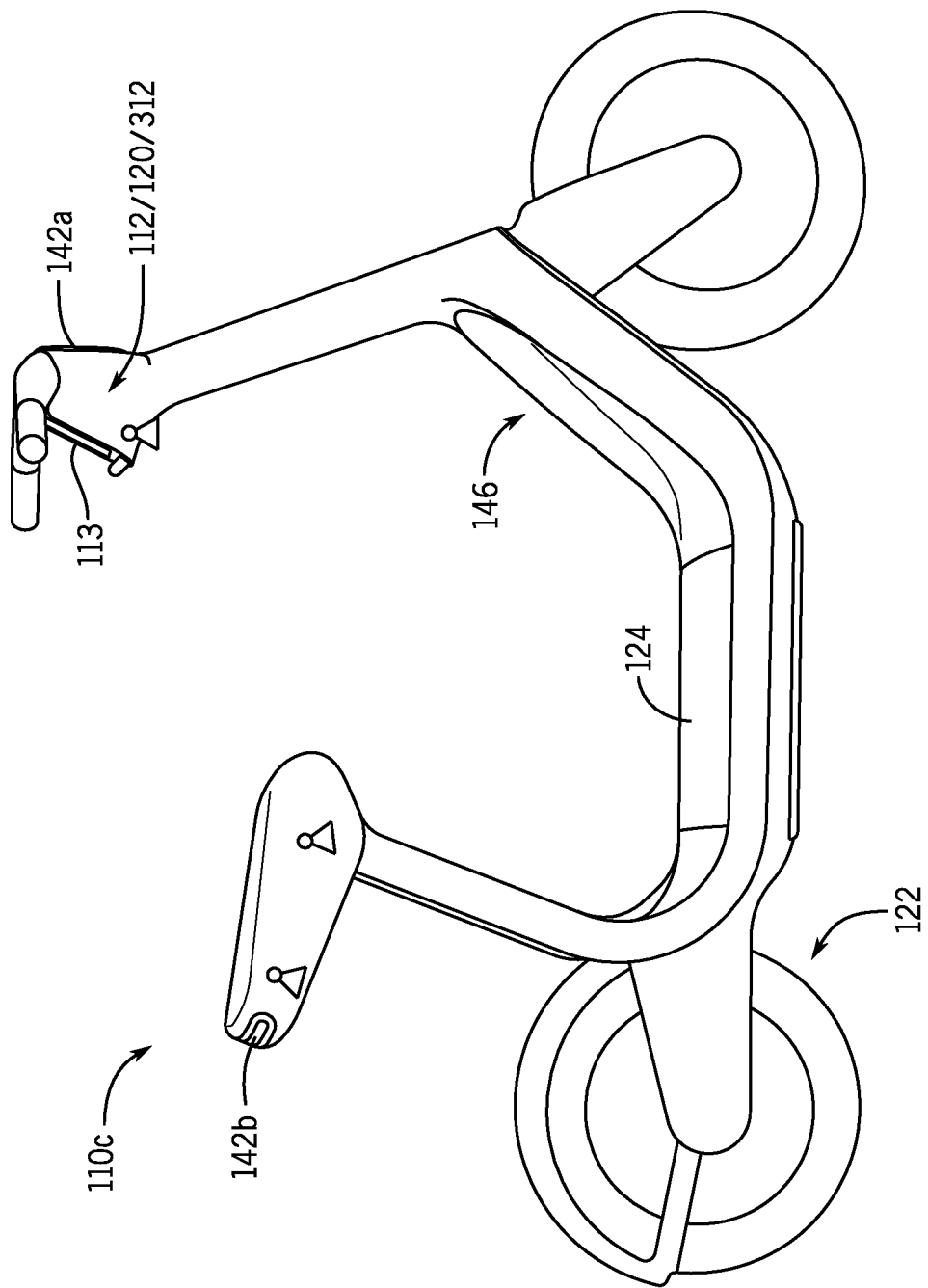
Figure 3C:
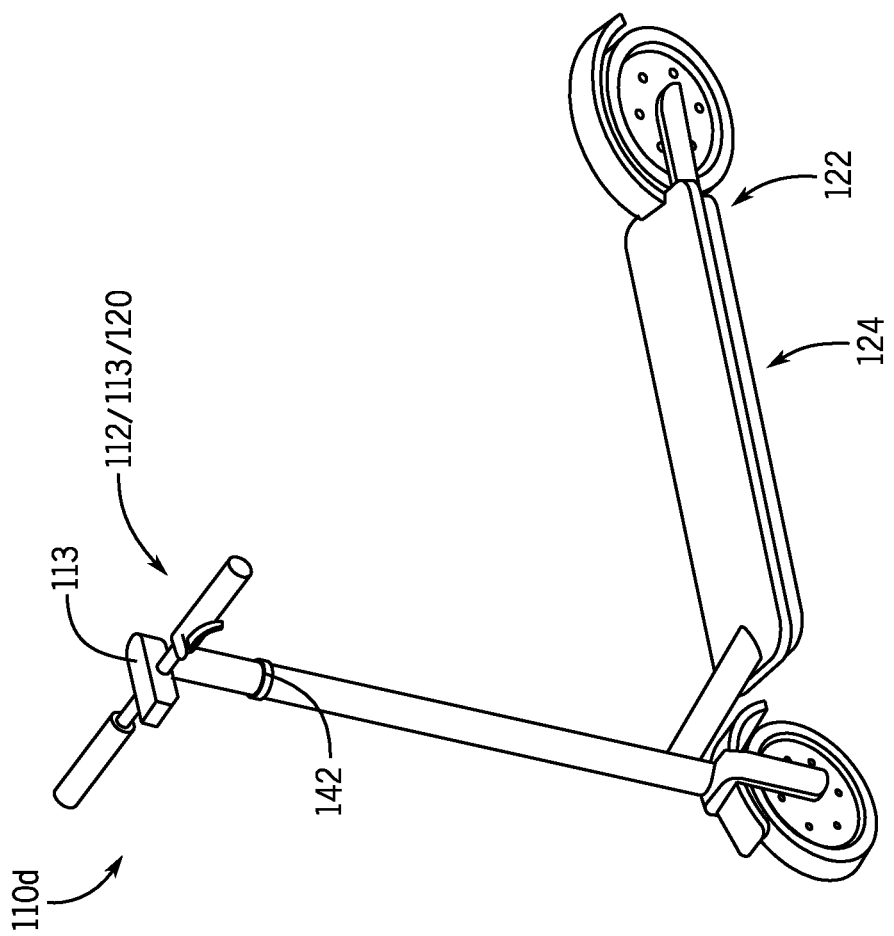

FIGS. 3A, 3B, and 3C illustrate respective diagrams of micromobility transit vehicles 110b, 110c, and 110d, which may be integrated network systems in accordance with an embodiment of the disclosure. For example, transit vehicle 110b of FIG. 3A may correspond to a motorized bicycle integrated with the various elements of system 100 and may be configured to participate in dynamic transportation matching system 200 of FIG. 2. As shown, transit vehicle 110b includes controller/user interface/wireless communications module 112/113/120 (e.g., integrated with a rear fender of transit vehicle 110b), propulsion system 122 configured to provide motive power to at least one of the wheels (e.g., a rear wheel 322) of transit vehicle 110b, battery 124 for powering propulsion system 122 and/or other elements of transit vehicle 110b, docking mechanism 140 (e.g., a spade lock assembly) for docking transit vehicle 110b at a docking station, user storage 146 implemented as a handlebar basket, and vehicle security device (e.g., an embodiment of vehicle security device 144 of FIG. 1), which may incorporate one or more of a locking cable 144a, a pin 144b coupled to a free end of locking cable 144a, a pin latch/insertion point 144c, a frame mount 144d, and a cable/pin holster 144e, as shown (collectively, vehicle security device 144). In some embodiments, controller/user interface/wireless communications module 112/113/120 may alternatively be integrated on and/or within a handlebar enclosure 313, as shown.

In some embodiments, vehicle security device 144 may be implemented as a wheel lock configured to immobilize rear wheel 322 of transit vehicle 110b, such as by engaging pin 144b with spokes of rear wheel 322. In the embodiment shown in FIG. 3A, vehicle security device 144 may be implemented as a cable lock configured to engage with a pin latch on a docking station, for example, or to wrap around and/or through a secure pole, fence, or bicycle rack and engage with pin latch 144c. In various embodiments, vehicle security device 144 may be configured to immobilize transit vehicle 110b by default, thereby requiring a user to transmit a request to management system 240 (e.g., via user device 130) to reserve transit vehicle 110b before attempting to use transit vehicle 110b. The request may identify transit vehicle 110b based on an identifier (e.g., a QR code, a barcode, a serial number, etc.) presented on transit vehicle 110b (e.g., such as by user interface 113 on a rear fender of transit vehicle 110b). Once the request is approved, management system 240 may transmit an unlock signal to transit vehicle 110b (e.g., via network 250). Upon receiving the unlock signal, transit vehicle 110b (e.g., controller 112 of transit vehicle 110b) may release vehicle security device 144 and unlock rear wheel 322 of transit vehicle 110b.

Transit vehicle 110c of FIG. 3B may correspond to a motorized sit-scooter integrated with the various elements of system 100 and may be configured to participate in dynamic transportation matching system 200 of FIG. 2. As shown in FIG. 3B, transit vehicle 110c includes many of the same elements as those discussed with respect to transit vehicle 110b of FIG. 3A. For example, transit vehicle 110c may include user interface 113, propulsion system 122, battery 124, controller/wireless communications module/cockpit enclosure 112/120/312, user storage 146 (e.g., implemented as a storage recess), and operator safety measures 142a and 142b, which may be implemented as various types of headlights, programmable light strips, and/or reflective strips.

Transit vehicle 110d of FIG. 3C may correspond to a motorized stand or kick scooter integrated with the various elements of system 100 and may be configured to participate in dynamic transportation matching system 200 of FIG. 2. As shown in FIG. 3C, transit vehicle 110d includes many of the same elements as those discussed with respect to transit vehicle 110b of FIG. 3A. For example, transit vehicle 110d may include user interface 113, propulsion system 122, battery 124, controller/wireless communications module/ cockpit enclosure 112/120/312, and operator safety measures 140, which may be implemented as various types programmable light strips and/or reflective strips, as shown.

Figure 3D:
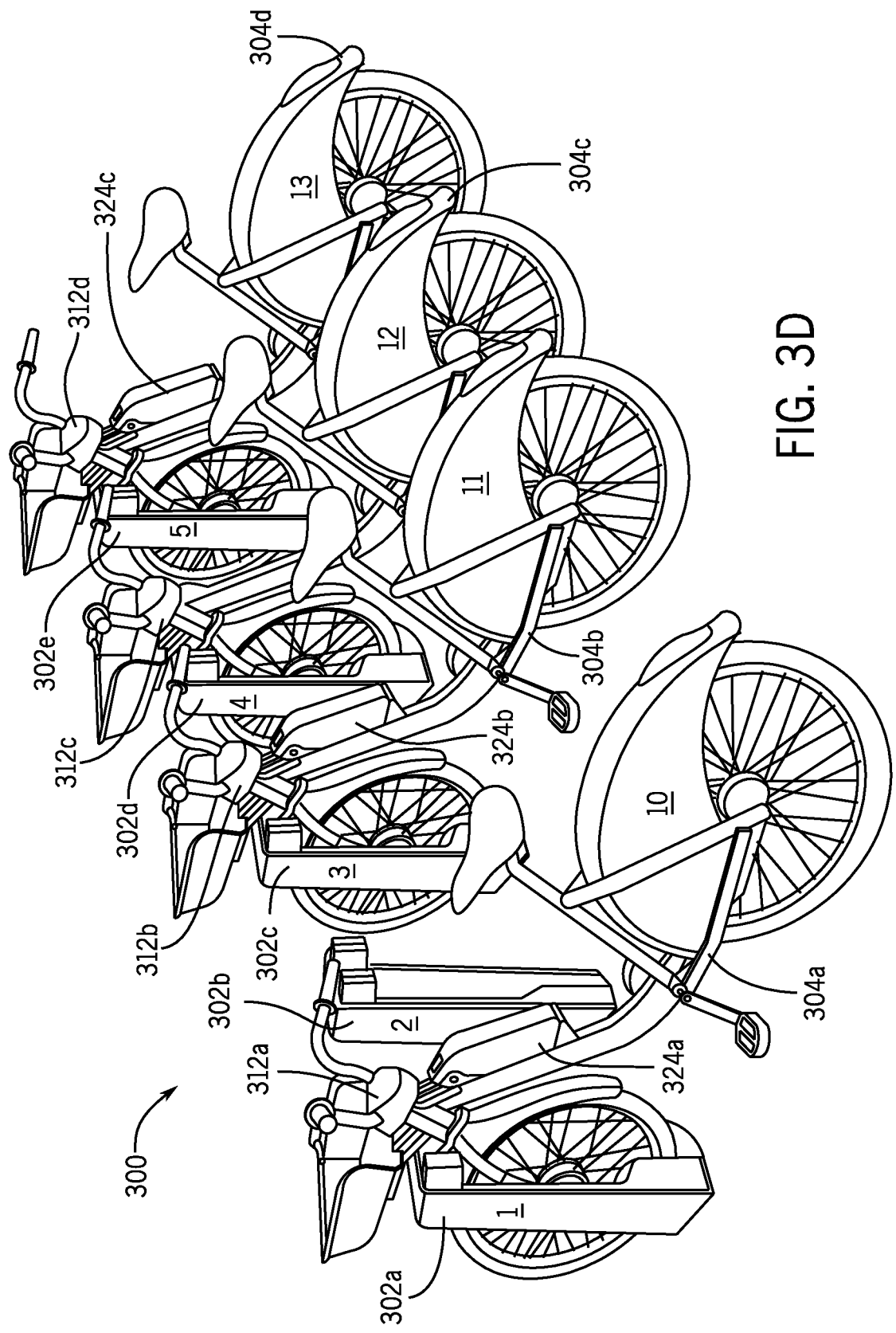
FIG. 3D illustrates a diagram of a docking station for docking one or more micromobility transit vehicles in accordance with an embodiment of the disclosure.

FIG. 3D illustrates a docking station 300 for docking transit vehicles (e.g., transit vehicles 110c, 110e, and 110g, etc.) according to one embodiment. As shown, docking station 300 may include multiple bicycle docks, such as docks 302a-e. In this example, a single transit vehicle (e.g., any one of electric bicycles 304a-d) may dock in each of the docks 302a-e of the docking station 300. Each of the docks 302a-e may include a lock mechanism for receiving and locking docking mechanism 140 of the electric bicycles 304a-d. In some embodiments, once a transit vehicle is docked in a bicycle dock, the dock may be electronically coupled to the transit vehicle (e.g., controllers 312a-d of the transit vehicle) via a link such that the transit vehicle and the dock may communicate with each other via the link.

A user may use a user device (e.g., user device 130) to use a micromobility transit vehicle 110b-d that is docked in one of the bicycle docks 302a-e by transmitting a request to management system 240. Once the request is processed, management system 240 may transmit an unlock signal to a micromobility transit vehicle 110b-d docked in the dock and/or the dock via network 250. The docking station 300 may automatically unlock the lock mechanism to release the micromobility transit vehicle 110b-d based on the unlock signal. In some embodiments, each of the docks 302a-e may also be configured to charge batteries (e.g., batteries 324a-c) of the electric bicycle 304a-d, respectively, when the electric bicycle 304a-d are docked at the docks 302a-e. In some embodiments, docking station 300 may also be configured to transmit information associated with the docking station 300 (e.g., a number of transit vehicles docked at the docking station 300, charge statuses of the docked transit vehicles, etc.) to the management system 240.

FIG. 4 illustrates a diagram of a user interface 400 associated with a micromobility transit vehicle 402 in accordance with an embodiment of the disclosure. The micromobility transit vehicle 402 may be similar to any one of transit vehicles 110b, 110c, or 110d, described above. The user interface 400 may be integrated with the micromobility transit vehicle 402, such as integrated with at least a portion of a cockpit of the micromobility transit vehicle 402. In some embodiments, the user interface 400 may form at least a portion of an outer housing of the handlebar of the micromobility transit vehicle 402. The user interface 400 may be visible to the user during operation. For instance, the user interface 400 may generally face rearwardly. The user interface 400 may include a display 410 configured to render information or other data. The display 410 may include many configurations, such as being an electronic ink display, although other configurations are contemplated. In other embodiments, the display 410 may be part of a mobile user computing device, such as a smart phone. As such, content, information, and data discussed herein as being presented on the display 410 can also or alternatively be displayed on the user computing device.

The user interface 400 may be similar to the user interface 113 or 132 described above. For example, route guidance information, usage cost, battery charge status, vehicle range, or other information related to the micromobility transit vehicle 402 may be rendered on the display 410. Information related to the operation of the micromobility transit vehicle 402, such as time information, map information, navigation information, instructions for operation, operational warnings or notifications, among others, may be rendered on the display 410. For example, one or more notifications may be rendered on the display 410 instructing or reminding the user to properly lock and/or park the micromobility transit vehicle 402. In some embodiments, the user interface 400 may present information similar to that described in U.S. patent application Ser. No. 16/578,995, entitled "Micromobility Electric Vehicle with Electronic Device Holder and Integrated Display," which is incorporated herein in its entirety for all purposes.

Figure 5A:
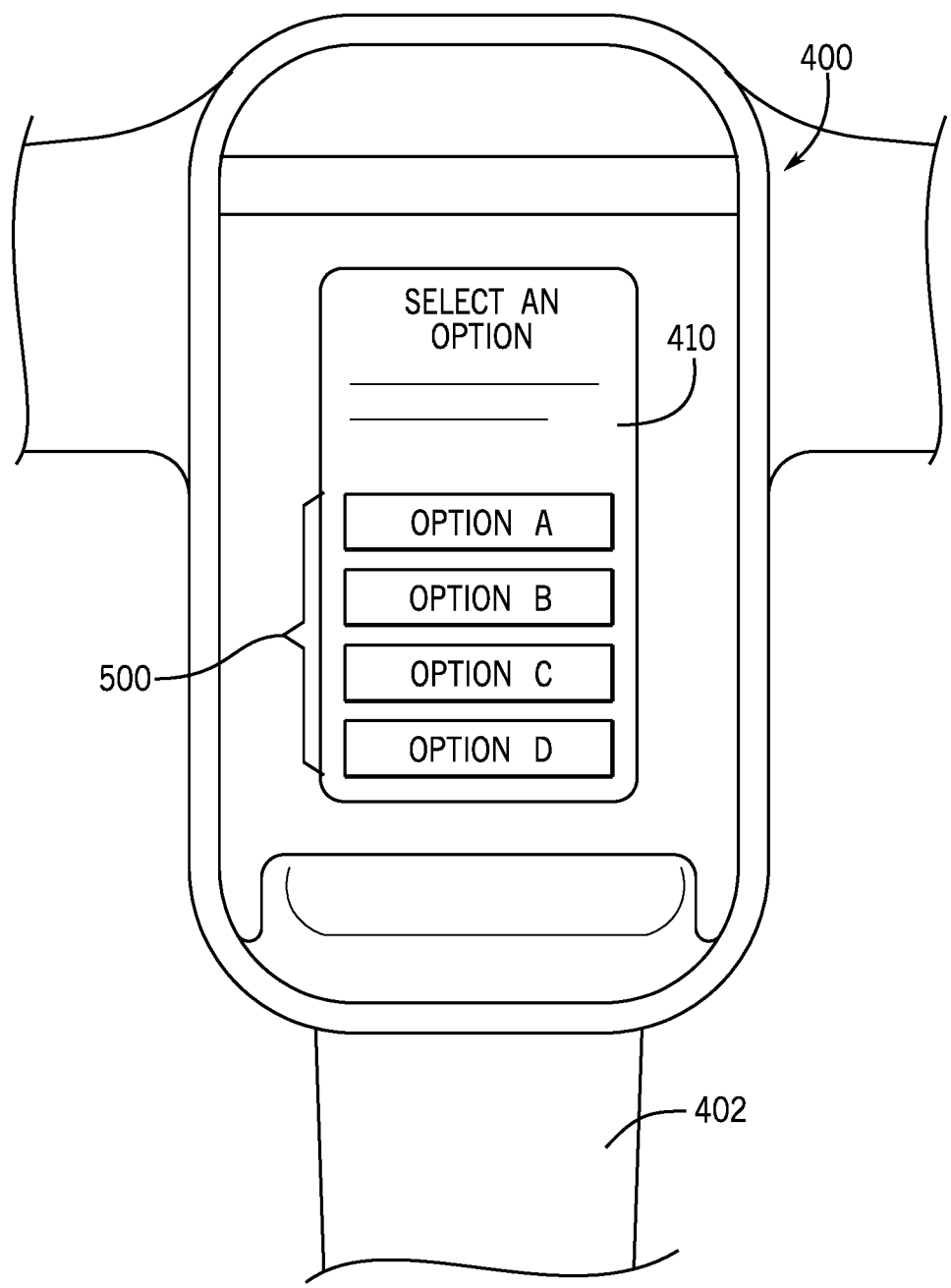
FIGS. 5A, 5B, and 5C illustrate respective diagrams of various examples of information rendered on a display of the user interface of FIG. 4 in accordance with an embodiment of the disclosure.
Figure 5B:
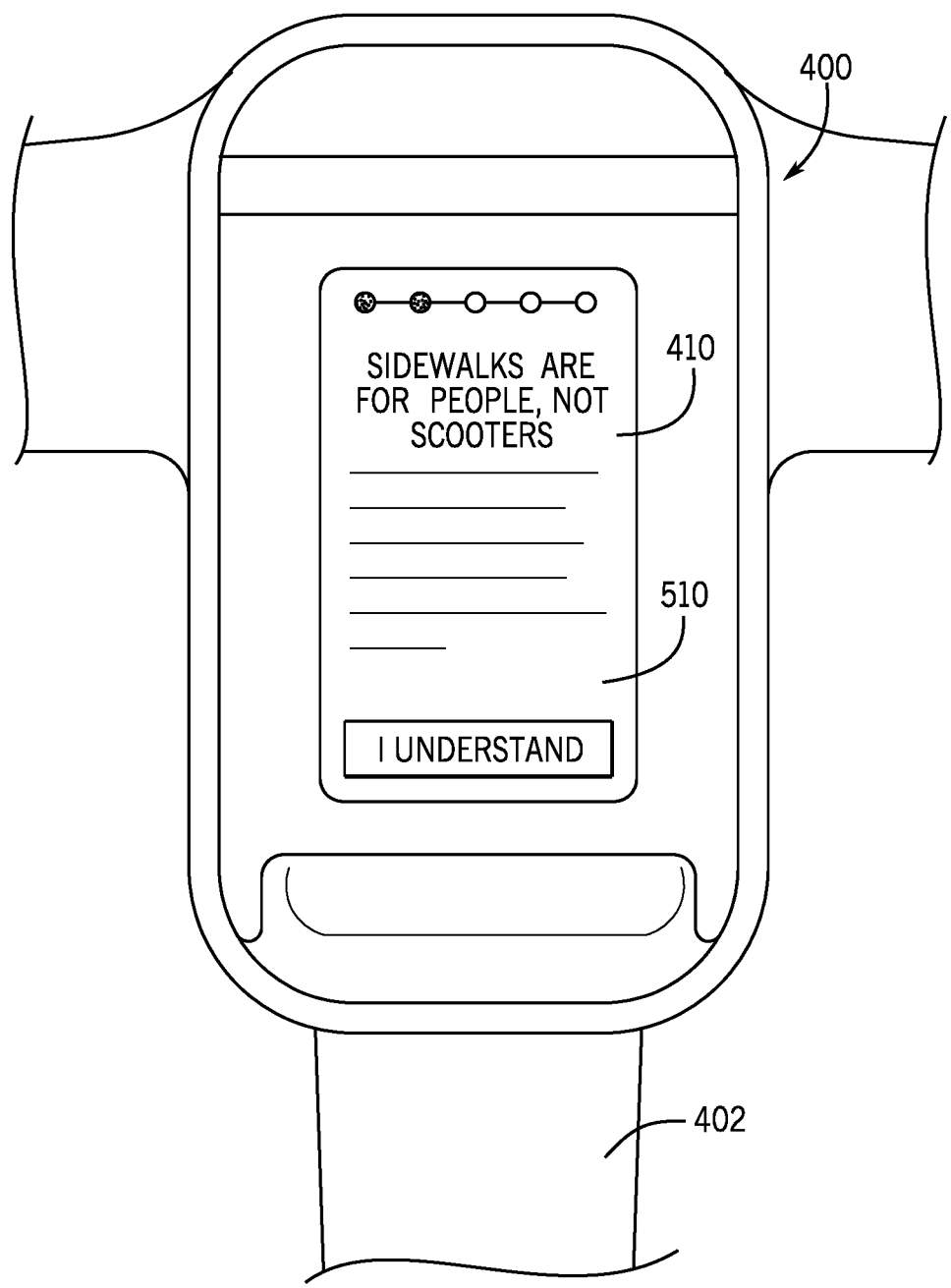
Figure 5C:
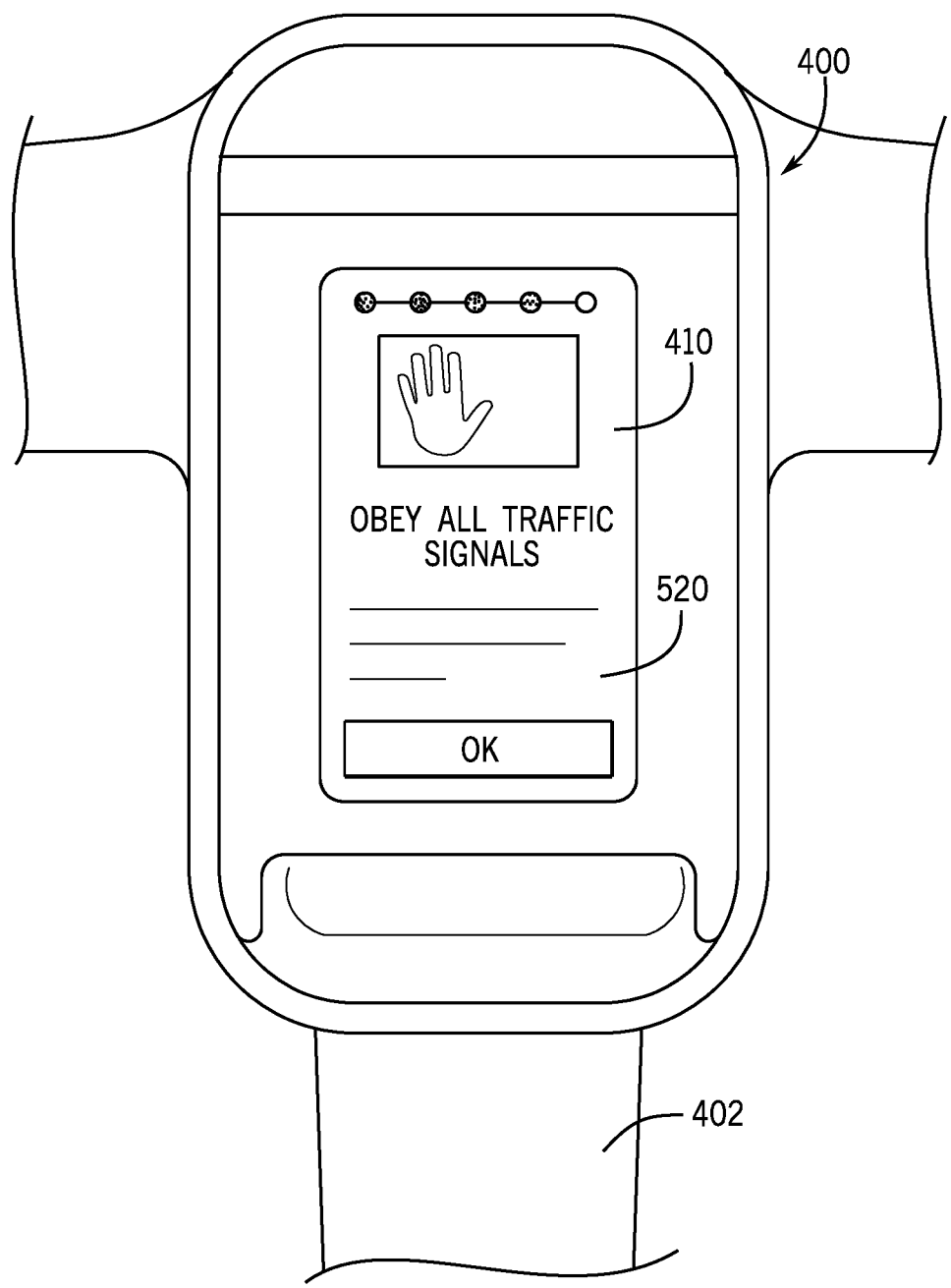

FIGS. 5A, 5B, and 5C illustrate respective diagrams of various examples of information rendered on the display 410 of the user interface 400 in accordance with an embodiment of the disclosure. The display 410 may render various information and different times, such as during operation of the micromobility transit vehicle 402, which includes starting, during, or ending a trip or prior to starting use or after ending a ride of the micromobility transit vehicle 402. For example, as shown in FIG. 5A, the display 410 may render one or more prompts, buttons, or selectable commands (hereinafter "options" 500 for sake of convenience, without intent to limit) for selection. The options 500 may prompt user selection to begin a ride, end a ride, pause a ride, or modify a ride, among others. In some embodiments, the options 500 rendered on the display 410 may allow user selection of one or more navigational commands, such as setting a starting location, setting a destination, starting navigational guidance, ending navigational guidance, modifying an existing navigation route, or the like. In some embodiments, the options 500 rendered on the display 410 may allow a user to unlock the micromobility transit vehicle 402 from a docking station, pair the micromobility transit vehicle 402 to a docking station, request service or maintenance of the micromobility transit vehicle 402, report issues with the micromobility transit vehicle 402, and the like. In some embodiments, the options 500 rendered on the display 410 may allow the user to turn on a headlight assembly, turn off the headlight assembly, or otherwise control operation of one or more systems of the micromobility transit vehicle 402.

Referring to FIG. 5B, the display 410 may render one or more notifications 510 related to operation of the micromobility transit vehicle 402. For instance, the display 410 may render use agreements, local rules and regulations, liability waivers, operation instructions, operation reminders, and the like for acknowledgment by the user before, during, or after use. Referring to FIG. 5C, the display 410 may render one or more notifications 520 based on a detected condition of the micromobility transit vehicle 402. For example, the display 410 may render one or more notifications of a detected use violation (e.g., excessive speed detection, traffic signal violation, etc.), parking violation (e.g., on street, within a landscaped area, within a handicapped zone, etc.), lock violation (e.g., free locking, to an improper sign or structure, failure to lock, etc.), or any combination thereof. In other embodiments, the notifications need not be for a violation, but can be for conveying changes during operation of the micromobility transit vehicle 402, providing warnings of upcoming hazards or congestion along the ride or trip, providing reminders for use or operation, providing messages at the start and/or end of a ride, including positive messages if the user has complied with all use regulations or guidelines during the trip or user account updates, such as status, number of rides completed, or total distance traveled on the ride or over multiple rides, and offers or advertisements, such as when the micromobility transit vehicle 402 is detected as being stationary or stopped.

Figure 5D:
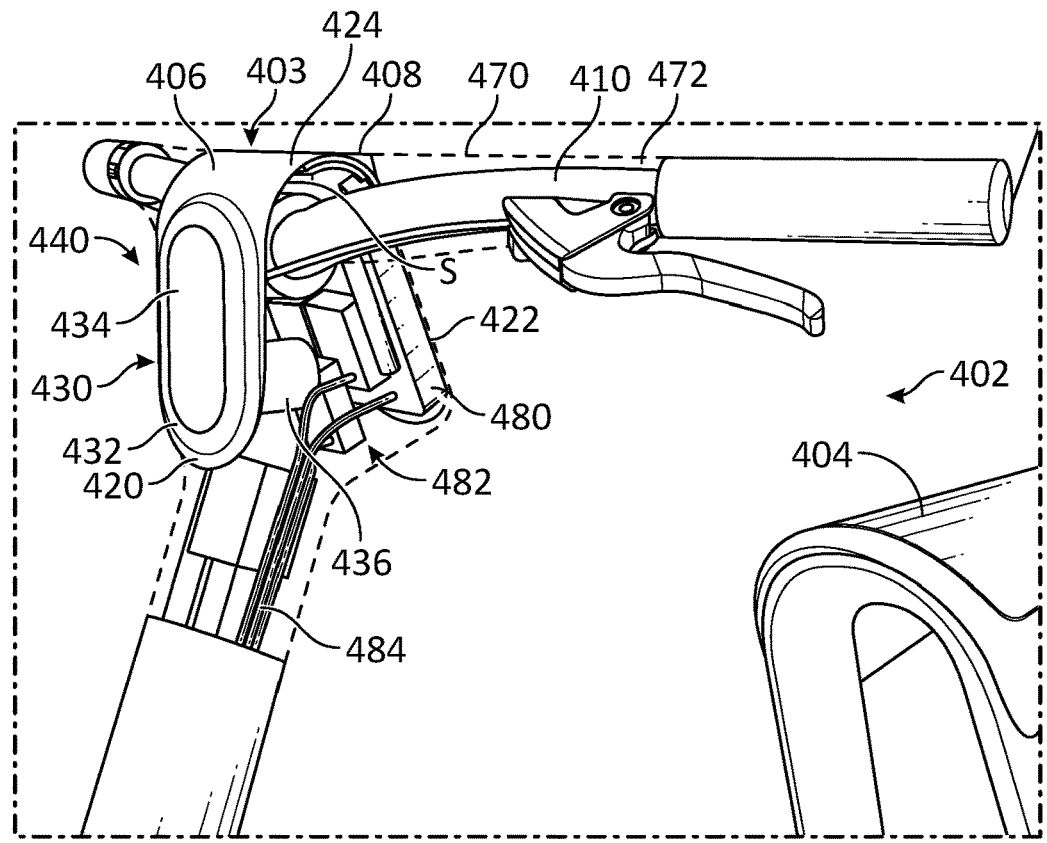
FIGS. 5D-6H illustrate views of example cockpit assemblies for a micromobility transit vehicle in accordance with various embodiments of the present disclosure.
Figure 5E:
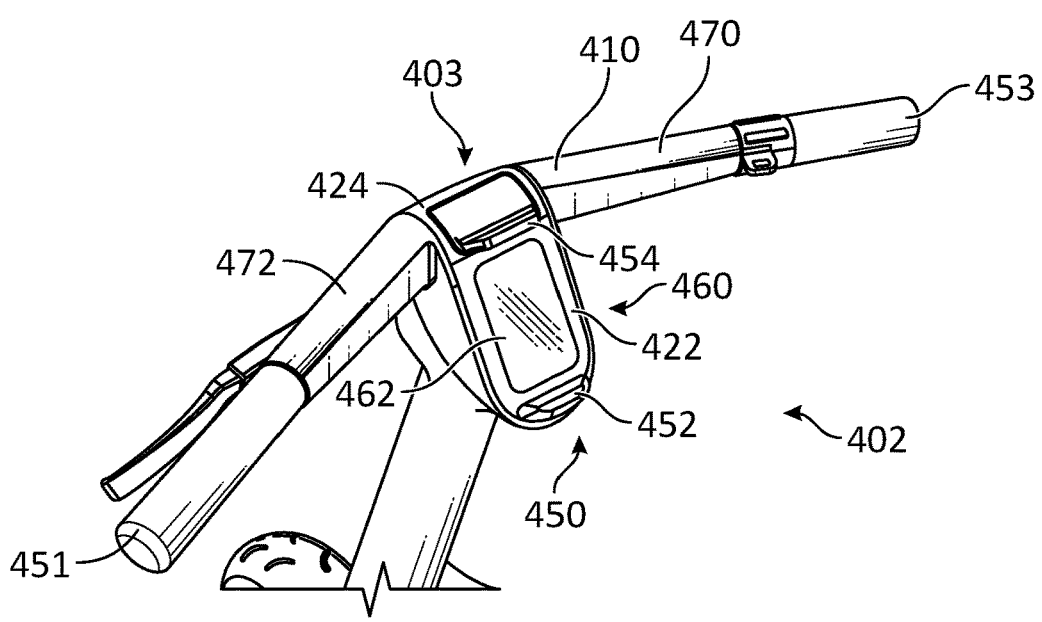

FIG. 5D illustrates a front perspective view of a cockpit assembly 403 for a micromobility transit vehicle 402 in accordance with one or more embodiments of the present disclosure. FIG. 5E illustrates a rear perspective view of the cockpit assembly 403 of FIG. 5D in accordance with an embodiment of the disclosure. Referring to FIGS. 5D and 5E, the micromobility transit vehicle 402 may include a cockpit assembly 403. In some embodiments, the micromobility transit vehicle 402 may include a user support 404 allowing a user to ride the micromobility transit vehicle 402. Depending on the type of transit vehicle, the user support 404 may be a seat, a standing platform, or the like, or any combination thereof. As described herein, the cockpit assembly 403 may provide a functional, intuitive, and distinctive cockpit or user interface for the user when riding the transit vehicle 402. For example, the cockpit assembly 403 may be implemented with a plurality of regions, interfaces, or elements integrating various components and/or features together. The micromobility transit vehicle 402 may be similar to any one of the micromobility transit vehicles 110b-d, described above. In some cases, the micromobility transit vehicle 402 may be, may be part of, or may include the transit vehicle 110.

The cockpit assembly 403 may include many configurations. As shown in FIGS. 5D and 5E, the cockpit assembly 403 may include at least two visible and at least partially opposed faces linked by a fold aligned along a long axis of a handlebar assembly 410 for the micromobility transit vehicle 402. Depending on the application, the cockpit assembly 403 may include a first face 420, a second face 422, and an intermediate portion 424 connecting the first face 420 to the second face 422. The first face 420 may include many configurations. For example, the first face 420 may be planar, curved along its length, curved along its width, or any combination thereof. Depending on the application, the first face 420 may extend or be oriented vertically or substantially vertically, may face forward, may face downwardly toward the front wheel, or the like to provide or support a desired function of the cockpit assembly 403. For example, the first face 420 may be formed to align a camera disposed within the cockpit assembly 403 with a desired and unobstructed field of view in front of the micromobility transit vehicle 402. For example, the field of view in front of the micromobility transit vehicle 402 may include the viewable area by the camera directed toward a forward direction of travel of the micromobility transit vehicle 402. In some cases, the front of the micromobility transit vehicle 402 may include a 180-degree angle in the forward direction of travel or any narrower angle within the 180-degree angle.

In some embodiments, the first face 420 may include or define one or more features facilitating use of the micromobility transit vehicle 402. For example, the first face 420 may include a headlight assembly 430. The headlight assembly 430 may illuminate a path ahead (above or below) and/or to the side of the micromobility transit vehicle 402. For example, the headlight assembly 430 may be configured to illuminate a road surface substantially in front of the micromobility transit vehicle 402. In some embodiments, the headlight assembly 430 may signal the presence of the micromobility transit vehicle 402 to oncoming vehicular and non-vehicular traffic. In some embodiments, the headlight assembly 430 may provide one or more indications for turn signals. In some embodiments, the headlight assembly 430 may display information about the micromobility transit vehicle 402. For instance, the headlight assembly 430 may turn on and/or flash in a predetermined sequence upon a user starting, turning on, and charging the micromobility transit vehicle 402. In some embodiments, the headlight assembly 430 may be used to indicate a threat level of the micromobility transit vehicle 402. For instance, the headlight assembly 430 may flash one or more alarm signals when there are indications of threat, such as possible theft, abandonment, and/or other critical statuses of the micromobility transit vehicle 402. Each of these features are described in more detail below.

The headlight assembly 430 may include many configurations. For instance, the headlight assembly 430 may include one or more light sources having similar or different characteristics (e.g., color, luminosity, frequency, etc.) controlled individually or together as a unit. As shown in FIG. 5D, the headlight assembly 430 may include a strip array 432 defining a pill-shaped center region 434 of the first face 420. The strip array 432 may be arranged in an ellipse or oval shape, with a length greater than a width, similar to a racetrack or stadium shape, to define the pill-shaped center region 434. In such embodiments, the strip array 432 may be positioned along the first face 420 such that its length is vertical or substantially vertical, though other configurations are contemplated, including rectangular, circular, and square-shaped.

The strip array 432 may provide a first lighting characteristic of the headlight assembly 430. For instance, the strip array 432 may include a plurality of light emitting and/or reflecting elements. Depending on the application, the strip array 432 may provide a passive or active lighting characteristic of the headlight assembly 430. For instance, the strip array 432 may be defined by reflective tape, paint, or other reflective material. For example, the strip array 432, as well as other reflectors of the micromobility transit vehicle 402, may be defined or formed at least partially by light reflecting elements, such as reflective beads. In such embodiments, the light reflecting elements (e.g., reflective glass or other reflective material beads) may be embedded in paint, tape, and/or other elements applied or secured to the micromobility transit vehicle 402 to increase nighttime safety by shining (e.g., brightly) under ambient lighting conditions and/or headlight beams.

In some embodiments, the strip array 432 may be defined by an array of light emitting diodes (LEDs) or other light emitting elements. Depending on the application, the light emitting elements may be programmable. For example, each light emitting element of the strip array 432 may be controlled by a processing element, such as controller 112, described above. The programmable light emitting elements, as controlled by a controller (e.g., controller 112), may provide a desired lighting characteristic of the headlight assembly 430. For instance, the strip array 432 may be configured to provide asymmetrically biased peripheral lighting during operation of the headlight assembly 430. For instance, the strip array 432 may be configured to provide directional lighting based on the relative position of the handlebar assembly 410. If the handlebar assembly 410 is rotated to the right (i.e., the handlebar assembly 410 is rotated to cause the micromobility transit vehicle 402 to turn towards the right), the strip array 432 may provide directional lighting to the right of the vehicle. For instance, a right portion of the strip array 432 may turn on or increase in brightness to illuminate, or better illuminate, a field of view to the right of the micromobility transit vehicle 402. In some embodiments, a left portion of the strip array 432 may turn off if already illuminated to limit projection of light to the left of the micromobility transit vehicle 402.

Similarly, if the handlebar assembly 410 is rotated to the left (i.e., the handlebar assembly 410 is rotated to cause the micromobility transit vehicle 402 to turn towards the left), the strip array 432 may provide directional lighting to the left of the vehicle. For example, a left portion of the strip array 432 may turn on or increase in brightness to illuminate, or better illuminate, a field of view to the left of the micromobility transit vehicle 402. In some embodiments, a right portion of the strip array 432 may turn off if already illuminated to limit projection of light to the right of the micromobility transit vehicle 402. In some embodiments, when the handlebar assembly 410 is detected as turning right or left beyond a certain threshold, the strip array 432 may automatically engage a turn signal or illumination that indicates to others that the micromobility transit vehicle 402 is turning right or left, which eliminates the need for the user of the micromobility transit vehicle 402 to manually operate a turn signal control.

The strip array 432 may provide the asymmetrically biased peripheral lighting during operation in other configurations. For example, the biased directional lighting provided by the strip array 432 may be based on a projected path of the micromobility transit vehicle 402. For example, using GPS navigation, the strip array 432 may bias peripheral lighting to either the right or the left of the micromobility transit vehicle 402 to prepare for an upcoming turn to follow a GPS navigational route. In some embodiments, the light emitting elements may move to direct light to the left or to the right of the micromobility transit vehicle 402 based on the relative position of the handlebar assembly 410.

In some embodiments, the strip array 432 may be configured to provide color and/or luminosity-differentiated animated light patterns during operation. For example, the strip array 432 may provide one or more color and/or luminosity-differentiated indications for turn signals. For example, the right portion of the strip array 432 may flash one or more color and/or luminosity-differentiated indications in a predetermined sequence to indicate an upcoming right turn of the micromobility transit vehicle 402, whether indicated by a user or anticipated along a GPS navigational route. In like manner, the left portion of the strip array 432 may flash one or more color and/or luminosity-differentiated indications in a predetermined sequence to indicate an upcoming left turn of the micromobility transit vehicle 402, whether indicated by a user or anticipated along a GPS navigational route. In some embodiments, the strip array 432 may flash one or more color and/or luminosity-differentiated indications in a predetermined sequence upon a user starting the micromobility transit vehicle 402. In some embodiments, the strip array 432 may flash one or more color and/or luminosity-differentiated indications in a predetermined sequence to indicate a threat level of the micromobility transit vehicle 402, such as when there are indications of possible theft, abandonment, and/or other critical statuses of the micromobility transit vehicle 402.

With continued reference to FIG. 5D, the headlight assembly 430 may include a cone beam light assembly 436, whether in addition to or in lieu of the strip array 432. The cone beam light assembly 436 may be disposed within the pill-shaped center region 434 of the first face 420. The cone beam light assembly 436 may provide a second lighting characteristic of the headlight assembly 430. For instance, the cone beam light assembly 436 may include many configurations for illuminating the path ahead of the micromobility transit vehicle 402. For instance, the cone beam light assembly 436 may include one or more incandescent lamps, halogen lamps, high intensity discharge lamps, LEDs, or any combination thereof providing a desired lumens output of the headlight assembly 430. The intensity or direction of light may depend on environmental conditions, as indicated by sensors on the micromobility transit vehicle 402 or provided through the transit vehicle management system, such as in foggy, rainy, snowy, or other conditions that may allow the user to better see while using the micromobility transit vehicle 402. Depending on the application, the cone beam light assembly 436 may be recessed within the pill-shaped center region 434 or flush with an outer surface of the first face 420, such as to provide a desired shape of the light projected from the cone beam light assembly 436.

The first face 420 may include other features. For instance, the cockpit assembly 403 may include a camera 440 disposed on the first face 420. In some embodiments, the camera 440 may be disposed adjacent to the headlight assembly 430. For instance, the camera 440 may be disposed adjacent to the cone beam light assembly 436 within the pill-shaped center region 434 of the first face 420, though other configurations are contemplated. The camera 440 may include many configurations. For instance, the camera 440 may be configured to capture images and/or video including the road surface substantially in front of the micromobility transit vehicle 402. The camera 440 may be similar to camera 138 or 148, described above.

Referring to FIG. 5E, the second face 422 may include various configurations. Like the first face 420, the second face 422 may be planar, curve along its length, curve along its width, or any combination thereof. As shown, the second face 422 is disposed substantially opposite the first face 420. The second face 422 may be inclined relative to the substantially vertical first face 420. The second face 422 may extend vertically or substantially vertically, may face rearward, may face upwardly towards a user or user support, or the like to provide or support a desired function of the cockpit assembly 403. For example, the second face 422 may include or define one or more features facilitating use of the micromobility transit vehicle 402. In some embodiments, the second face 422 may include a mobile computing device holder 450. As described herein, the mobile computing device holder 450 may grasp and/or otherwise secure a portable electronic device (e.g., a smartphone, tablet, smart watch, or other mobile device) to the cockpit assembly 403. The mobile computing device holder 450 may be positioned such that the portable electronic device secured therein is easily viewable and/or readily available during operation of the micromobility transit vehicle 402. In some embodiments, the mobile computing device holder 450 may be similar to the electronic device holder described in U.S. patent application Ser. No. 16/578,995, filed Sep. 23, 2019, and entitled "MICROMOBILITY ELECTRIC VEHICLE WITH ELECTRONIC DEVICE HOLDER AND INTEGRATED DISPLAY," which is hereby incorporated by reference in its entirety for all purposes.

The mobile computing device holder 450 may include many configurations. In some embodiments, the mobile computing device holder 450 may include a first gripping element 452 and a second gripping element 454 disposed on opposing sides of the mobile computing device holder 450. Each of the first gripping element 452 and the second gripping element 454 may include a pad of friction producing material to grip a mobile device, such as the side of a mobile device. The second gripping element 454 may be movable relative to the first gripping element 452 to accommodate or secure mobile computing devices of various sizes. The second gripping element 454 may be spring loaded and biased towards the first element. In such embodiments, the mobile computing device holder 450 may grip a mobile device using forces (e.g., spring-based forces) applied by the first gripping element 452 and the second gripping element 454 against the sides or edges of the mobile device within the holder. For instance, the second gripping element 454 may be extended away from the first gripping element 452 to accept a height or width of a mobile computing device. Once the second gripping element 454 is extended a sufficient distance away from the first gripping element 452, the mobile computing device may be placed within the mobile computing device holder 450 between the first gripping element 452 and the second gripping element 454. Once the mobile computing device is placed within the mobile computing device holder 450, the second gripping element 454 may be collapsed towards the first gripping element 452 to secure the mobile computing device in the mobile computing device holder 450.

In some embodiments, hand gripping elements 451 and 453 may be equipped with sensors, such as pressure, temperature, heart rate, and perspiration sensors, that enable the micromobility transit vehicle 402 and/or the management system 240 to receive data from such sensors and adjust the ride or operation of the micromobility transit vehicle 402 accordingly. For example, if a sensed heart rate increases beyond a certain threshold and pressure applied to one or both of the hand gripping elements has increased, the user may be determined to be nervous or under stress, and appropriate action can be taken, such as reducing the speed of the micromobility transit vehicle 402.

In some embodiments, the second face 422 may include a user interface 460 for the micromobility transit vehicle 402. The user interface 460 may be configured to face a user of the micromobility transit vehicle 402. The user interface 460 may include a display 462 configured to present information or other data to the user during operation. The user interface 460 may be similar to the user interface 113 or 132, described above. For example, the user interface 460 may present route guidance information, usage cost, battery charge status, a predicted remaining range, or other suitable information related to the micromobility transit vehicle 402, as described above. In some embodiments, the user interface 460 may present information similar to that described in U.S. patent application Ser. No. 16/578,995, filed Sep. 23, 2019, and entitled "MICROMOBILITY ELECTRIC VEHICLE WITH ELECTRONIC DEVICE HOLDER AND INTEGRATED DISPLAY," which is hereby incorporated by reference in its entirety for all purposes. The user interface 460 may also present other information useful during operation of the micromobility transit vehicle 402, such as time information, map or navigation information, or the like. The display 462 may be an electronic ink display, though other configurations are contemplated.

As shown, the user interface 460 may be disposed adjacent to and/or beneath the mobile computing device holder 450. For example, the user interface 460 may be arranged between the first gripping element 452 and the second gripping element 454 of the mobile computing device holder 450. Thus, the user interface 460 may be at least partially concealed by or hidden behind a mobile device positioned within the mobile computing device holder 450. In such embodiments, the display of the mobile device may present the same, different, or additional information that the display 462 is configured to present. In addition, the display 462 may be turned off or dimmed when a mobile device is secured within the mobile computing device holder 450 to save power.

The mobile device within the mobile computing device holder 450 may control one or more electronics of the micromobility transit vehicle 402, such as through a wired connection, short range wireless communication, and/or through connection over a wide area network to a server exchanging information with control electronics of the micromobility transit vehicle 402. For example, when positioned within the mobile computing device holder 450, a mobile device may provide an interface through which a user may provide or receive commands or information about the state of the micromobility transit vehicle 402 during operation. Such interface functionality may be provided by an app on the mobile device.

In further reference to FIGS. 5D and 5E, the intermediate portion 424 may define a fold or arcuate portion linking the first face 420 to the second face 422. For example, the intermediate portion 424 may connect a first top portion of the first face 420 to a second top portion of the second face 422. In this manner, the first face 420, the second face 422, and the intermediate portion 424 may form part of a unitary structure configured to couple to the handlebar assembly 410. For example, the first face 420, the second face 422, and the intermediate portion 424 may wrap at least partially around the handlebar assembly 410 to position the first face 420 on a forward-facing portion of the micromobility transit vehicle 402 and the second face 422 on a rearward facing portion of the micromobility transit vehicle 402. In some embodiments, the first face 420, the second face 422, and the intermediate portion 424 may wrap at least partially around the handlebar assembly 410 to orient the first face 420 towards a front of the handlebar assembly 410 and/or the micromobility transit vehicle 402 and the second face 422 towards a rear of the handlebar assembly 410 and/or the micromobility transit vehicle 402. Depending on the application, the cockpit assembly 403 may wrap at least partially around a central stem assembly of the handlebar assembly 410. As described herein, the central stem assembly may include at least portions of a headset, a stem, and/or other mechanical elements of the handlebar assembly 410 configured to form the handlebar assembly 410 and mechanically couple the handlebar assembly 410 to the steering column/mechanism of the micromobility transit vehicle 402.

In some embodiments, the intermediate portion 424 may include an arc length S to position the first face 420 in a first position angled forwardly away from a user during operation of the micromobility transit vehicle 402, and to position the second face 422 in a second position angled towards the user. In some embodiments, the intermediate portion 424 may include or define an arcuate panel curved along the long axis of the handlebar assembly 410. As shown, the first face 420 may be angled forwardly away from the user support 404, such as forwardly away from a seat. For instance, the first face 420 may face away from a user of the transit vehicle 402 when the user is positioned on the user support 404. In such embodiments, the second face 422 may be angled rearwardly towards the user support 404. For example, the second face 422 may face the user support 404 or face a user of the transit vehicle 402 when the user is positioned on the user support 404.

In some embodiments, the user support 404, such as a standing platform, may define a first plane, and the second face 422 may define a second plane. In such embodiments, the first plane may be at an angle to the second plane. For instance, the angle between the first plane and the second plane may be 90°, approximately 90°, less than 90°, or greater than 90° such that the second face 422 faces a user of the transit vehicle 402 during operation of the transit vehicle 402. For example, the second face 422 may be positioned to define a diagonal plane creating an angle to a vertical or horizontal axis of the transit vehicle 402.

In some embodiments, the first face 420 and the second face 422 may extend tangentially from the intermediate portion 424 to provide a smooth wrap around design of the cockpit assembly 403. For example, the first face 420 may be defined, at least partially, by a tangent plane to the intermediate portion 424 at a first point or line 406, with the first face 420 extending from the intermediate portion 424 at the first point or line 406. Similarly, the second face 422 may be defined, at least partially, by a tangent plane to the intermediate portion 424 at a second point or line 406, with the second face 422 extending from the intermediate portion 424 at the second point or line 408. As shown, the first point or line 406 may be positioned on a front portion of handlebar assembly 410, and the second point or line 408 may be positioned on a rear portion of the handlebar assembly 410 to wrap the cockpit assembly 403 at least partially around the handlebar assembly 410.

The cockpit assembly 403 may form at least a portion of an outer housing 470 of the handlebar assembly 410. For example, as shown in FIG. 5D, the cockpit assembly 403 may interface with a clamshell housing 472 to form the outer housing 470 of the handlebar assembly 410. The interface between the cockpit assembly 403 and the clamshell housing 472 may provide a weathertight seal of the outer housing 470. For instance, the interface between the cockpit assembly 403 and the clamshell housing 472 may seal the interior of the outer housing 470 from rain, moisture, or other debris ingress.

In various embodiments, the cockpit assembly 403 may include other features. For instance, the cockpit assembly 403 may include a control module 480 and a wiring harness 482. The control module 480, which may be positioned between the first face 420 and the second face 422, may include one or more processing elements, memory, or other electronic elements or modules to control operation of the cockpit assembly 403 and/or the micromobility transit vehicle 402. For instance, the cockpit assembly 403 may be configured to receive and/or control power provided by a power source (e.g., battery) for an electric motor of a propulsion system of the micromobility transit vehicle 402. In some embodiments, the control module 480 may include the display 462, which may be attached to the second face 422. The wiring harness 482 may provide an interface between the cockpit assembly 403 (e.g., the control module 480) and electronic cabling 484 (e.g., for the throttle, wheel motors, etc.). For example, the wiring harness 482 may provide a simple one connector attachment of the cockpit assembly 403 to one or more electronic cabling 484 or other electronics of the micromobility transit vehicle 402.

The cockpit assembly 403 may be assembled to the micromobility transit vehicle 402 in many configurations. For example, the headlight assembly 430 may be coupled to the first face 420 of the cockpit assembly 403. The mobile computing device holder 450 and/or the display 462 of the user interface 460 may be coupled to the second face 422 of the cockpit assembly 403. The assembled cockpit assembly 403 may then be coupled to the micromobility transit vehicle 402 such that the cockpit assembly 403 wraps at least partially around the handlebar assembly 410, such as at least partially around a central stem assembly of the handlebar assembly 410.

Figure 6A:
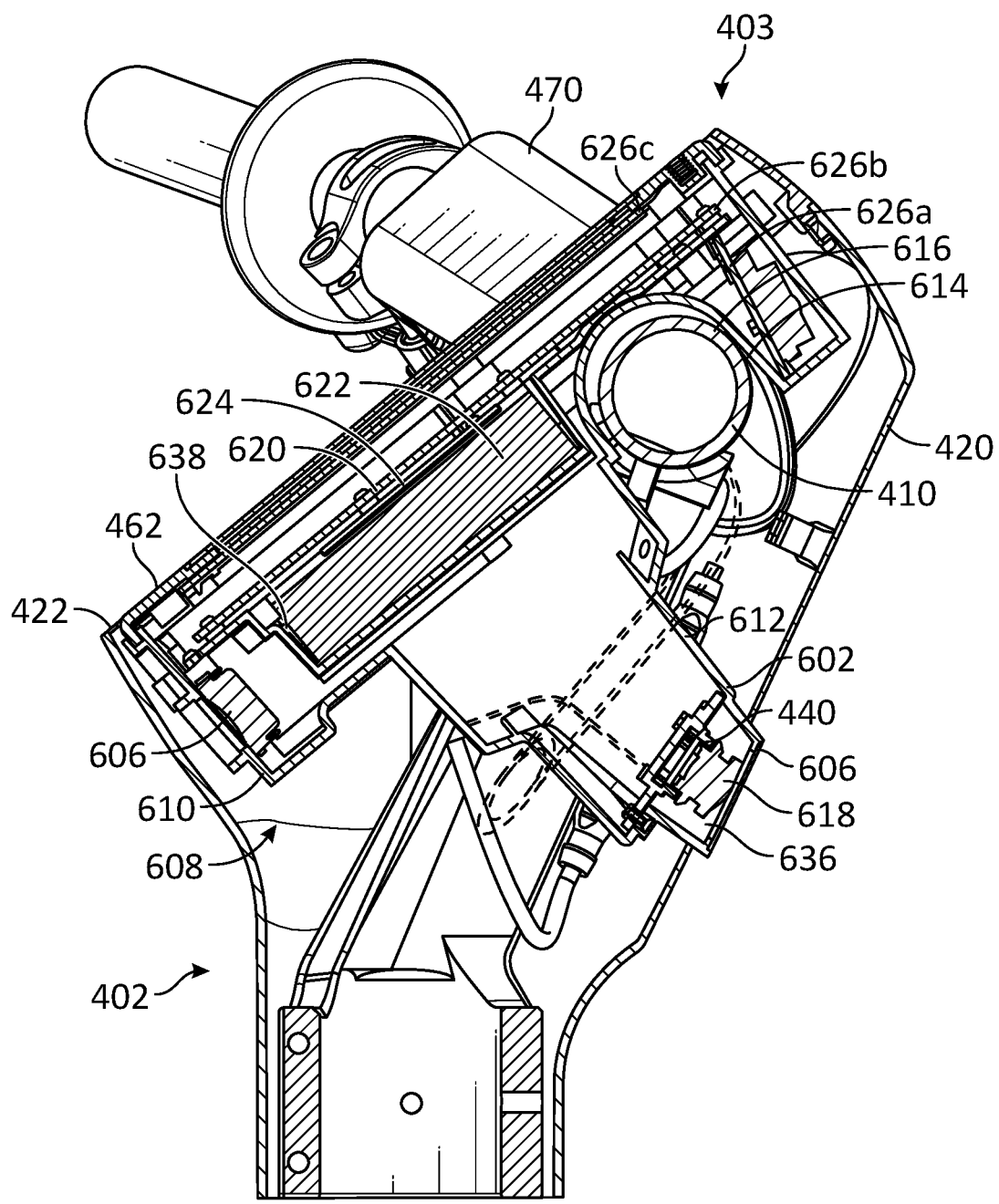

Referring now to FIGS. 6A-6H, illustrated are various views of the cockpit assembly 403 of the micromobility transit vehicle 402 in accordance with various embodiments of the present disclosure. In particular, FIG. 6A illustrates a cross-sectional side view of the cockpit assembly 403 of a micromobility transit vehicle 402 in accordance with one or more embodiments of the disclosure. The cockpit assembly 403 may include a cockpit housing 602 (e.g., vehicle control unit housing) disposed within a cavity 608 defined as a space between the first face 420 coupled to the second face 422 of the cockpit assembly 403. The cockpit housing 602 may extend from the first face 420 to the second face 422 of the cockpit assembly 403 through the cavity 608 in some embodiments. The display 462 may be embedded in a first portion 610 of the cockpit housing 602 and exposed on the second face 422 of the cockpit assembly 403 to allow a user to interact therewith. The first portion 610 may have a surface 614 configured to wrap at least partially around a central stem 616 of the handlebar assembly 410 within the cavity 608. In some cases, surface 614 may be substantially arcuate to complement a counterpart arcuate surface of the central stem 616. In other cases, surface 614 may be formed to have a complementary shape configured to complement the surface of the central stem 616 to provide a secure interface between the two components.

According to various embodiments, a camera 440 may be disposed in a second portion 612 of the cockpit housing 602. The second portion 612 may extend (e.g., protrude) from the first portion 610 through the cavity 608 toward the first surface 420 of the cockpit assembly 403. In some embodiments, the second portion 612 may be substantially funnel-shaped. In some embodiments, the second portion 612 of the cockpit housing 602 may have a camera window 606 disposed at an end thereof. The camera window 606 may be embedded in the first face 420 of the cockpit assembly 403 in some embodiments. In some embodiments, the camera window 606 may be a transparent, tinted, plastic, and/or glass. In some embodiments, the camera window 606 may have one or more coatings disposed thereon. In some cases, the coatings may be layered to provide an overall effect suitable for a desired application. The coating(s) may be applied to one or both sides of the camera window 606 according to various implementations. For example, a coating may be configured to repel liquid (e.g., water), mud, oil, snow, dirt, and other environmental debris from the camera window 606. In some cases, the coating may be hydrophobic. In various embodiments, the coating may have scratch-resistant, anti-reflective, and/or anti-fog characteristics to allow for the camera 440 to capture clear images of its field of view. In further embodiments, the coating may include a bandpass filter. For example, a filter coating may reject wavelengths greater than 650 nm to provide for infrared rejection. In some implementations, the coating may be a replaceable film disposed thereon, and the replaceable film may have one or more of the above characteristics. In various embodiments, the replaceable film may be reusable such that cleaned films can be reused on various camera windows of transit vehicles in service.

In some embodiments, the second portion 612 may be configured to orient the camera 440 disposed therein to have a field of view in front of the micromobility transit vehicle 402. In this regard, the second portion 612 may be formed to align the camera window 606 with the first face 420 such that the camera window 606 may be substantially flush with a surface of the first face 420. In some cases, the second portion 612 may extend beyond the surface of the first face 420 to provide the camera 440 with an unobstructed field of view in front of the micromobility transit vehicle 402. In other cases, the second portion 612 may be sub-flush with the surface of the first face 420. For example, the surface of the first face 420 may have a cone shaped depressed portion in which the camera window 606 may be embedded. In some embodiments, a waterproof seal may encompass the camera window 606 that is embedded in the first surface 420 to protect the inner cavity 608 and components therein from environmental debris that may accumulate around or on the camera window 606.

The camera 440 may be configured to capture a field of view in front of the micromobility transit vehicle 402 through the camera window 606. In some embodiments, the camera 440 may be a visible light imager and/or thermal imager and an image captured in front of the micromobility transit vehicle 402 may be a visible light image or thermal image. In some embodiments, the camera 440 may have a wide optical field of view. For example, the wide optical field of view may allow for a user, remote from the micromobility transit vehicle 402, to recover the micromobility transit vehicle 402 as a location of the micromobility transit vehicle 402 may be identified from various features in images/video captured using the wide optical field of view. As another example, the wide optical field of view may allow for one micromobility transit vehicle to capture the presence of another micromobility transit vehicle that may be otherwise disabled (e.g., unable to establish a remote communication with the disabled micromobility transit vehicle to determine its location). In further embodiments, the camera 440 may include a sensor that has a selected pixel size. For example, a larger pixel size may be selected for the sensor to increase performance under low light conditions. In yet further embodiments, a focal length between a lens of the camera 440 and the sensor as well as an appropriate aperture may further increase performance under low light conditions. For example, the camera 440 may have a short focal length and wide aperture for low light performance such as when the micromobility transit vehicle 402 is traveling at night or otherwise is located in dark environments. Various depths of fields for the camera 440 may be utilized to suit a desired application. For example, a depth of field of approximately three feet may be utilized in some cases. It will be appreciated that the focal length, aperture, and depth of field of the camera 440 may be selected and/or adjusted to suit the desired application of the camera 440 and the micromobility transit vehicle 402.

In various embodiments, the images captured by the camera 440 may be used by a processing computer (e.g., controller 112) of the micromobility transit vehicle 402 to help control the micromobility transit vehicle 402. For example, in some embodiments where the camera 440 is a thermal imager, thermal images may be evaluated to determine whether the micromobility transit vehicle 402 is being operated in a crowded space with pedestrians. Under such conditions, the micromobility transit vehicle 402 may limit a maximum speed in which the micromobility transit vehicle 402 may be operated. For example, in instances where the camera 440 captures images and a threshold number of pedestrians are identified in the images, the micromobility transit vehicle 402 may be limited to a corresponding speed limit. For example, a number of pedestrians may correlate to a speed limit of the micromobility transit vehicle 402. To illustrate, if three pedestrians are identified in the field of view of the camera 440, the controller 112 may limit the micromobility transit vehicle 402 to an operative speed of five miles per hour. If one pedestrian is identified, the micromobility transit vehicle 402 may be limited to a speed of ten miles per hour, for example. In some embodiments, the camera 440 may operate as described in U.S. patent application Ser. No. 16/726,156, entitled "CAMERA-SENSOR FUSION MODULE FOR SURFACE DETECTION AND FLEET VEHICLE CONTROL SYSTEMS AND METHODS," which is incorporated herein in its entirety for all purposes.

In an aspect, a camera lens 618 of the camera 440 may be oriented to have an angle 636 with respect to camera window 606 to provide for the desired field of view in front of the micromobility transit vehicle 402. For example, the angle 636 may be approximately between 0 and 90 degrees and −90 degrees. The angle 636 may be adjusted to suit a desired application. For example, the first face 420 may have an angle that is not conducive to capturing images by the camera 440, thus the angle 636 may provide for a better viewing angle for the camera 440. Although FIG. 6A shows the angle 636 on one side of the camera lens 618, it will be appreciated that the angle 636 may be on the other side of the camera lens 618 to achieve the desired viewing angle for the camera 440.

In one or more embodiments, a midframe 620 may be disposed in the cavity 608 and fastened at a first end and a second end along a longitudinal axis of the first portion 610 of the cockpit housing 602. The midframe 620 may be formed out of a metal (e.g., aluminum, magnesium), high-density plastic, or other robust material to provide rigidity to the cockpit housing 602. In some embodiments, a battery 622 may be disposed in a cavity 638 defined by the midframe 620. In some cases, the battery 622 may be a backup battery configured to supply energy to various electrically powered components (e.g., antennas, processors, sensors, cameras) within the cockpit assembly 403 after a main battery of the micromobility transit vehicle 402 has discharged or is otherwise unavailable to provide power. For example, the main battery may be the battery (e.g., battery 124) that supplies energy to a propulsion system 122 of the micromobility transit vehicle 402. A battery cover 624 may secure and enclose the battery 622 in the cavity 638 defined by the midframe 620.

In some embodiments, a speaker 606 may be disposed in an end of the first portion 610 of the cockpit housing 602. The speaker 606 may be configured to provide audible notifications, alerts, sounds, and so forth to a user. For example, the speaker 606 may output an audible chime when the micromobility transit vehicle 402 is unlocked for use, turned on, turned off, parked, low on battery, fully charged, and so forth.

In additional examples, the speaker 606 may be synced with the display 462 to provide audio that corresponds with notifications or messages provided on the display 462. As a further example, the speaker 606 may output a high fidelity reading of the text displayed on the display 462. In another example, the micromobility transit vehicle 402 may be beyond a threshold distance away from a sidewalk along a street surface. The display 462 may provide a visual notification to the user indicating that the micromobility transit vehicle 402 is too far from the sidewalk while the speaker 606 simultaneously provides an audible notification of such to the user. In other cases, the audible notification may be a human-language-spoken high-fidelity alert that tells the user of the micromobility transit vehicle 402 that the micromobility transit vehicle 402 is too far from the curb for appropriate operation according to local ordinances and regulations. In some instances, the audible alert may tell the user to get off of the curb if the micromobility transit vehicle 402 detects that it is currently being operated on a curb. In such cases, the camera 440 may be used to detect that the user is riding the micromobility transit vehicle 402 on the curb. In further examples, the speaker 606 may provide navigational directions to a user as the user rides the micromobility transit vehicle. For example, the display 462 may display visual navigational directions to a user while the speaker 606 provides an audible reading of such navigation.

According to various embodiments, the cockpit housing 602 may have printed circuit boards (PCBs) disposed therein. The various PCBs may provide electronic processing and control units for various elements of the micromobility transit vehicle 402. For example, a PCB 626a disposed in an end of the first portion 610 may include a GNSS receiver (e.g., GNSS 118 of FIG. 1) in some instances. A PCB 626B longitudinally disposed in the first portion 610 may include a main control module for the micromobility transit vehicle 402 (e.g., controller 112 of FIG. 1). A PCB 626C longitudinally disposed in the first portion 610 underneath the display 462 may include a control module for the display 462 (e.g., user interface 113 of FIG. 1). One or more of the components described in reference to FIG. 1 may be or may be included in one of the PCBs shown in the cockpit assembly 403 of transit vehicle 402 according to various embodiments. It will be appreciated that the PCBs within the cockpit housing 602 may be communicatively coupled (e.g., via a CAN bus) to facilitate data transfer between different elements and/or sensors of the micromobility transit vehicle 402.

Figure 6B:
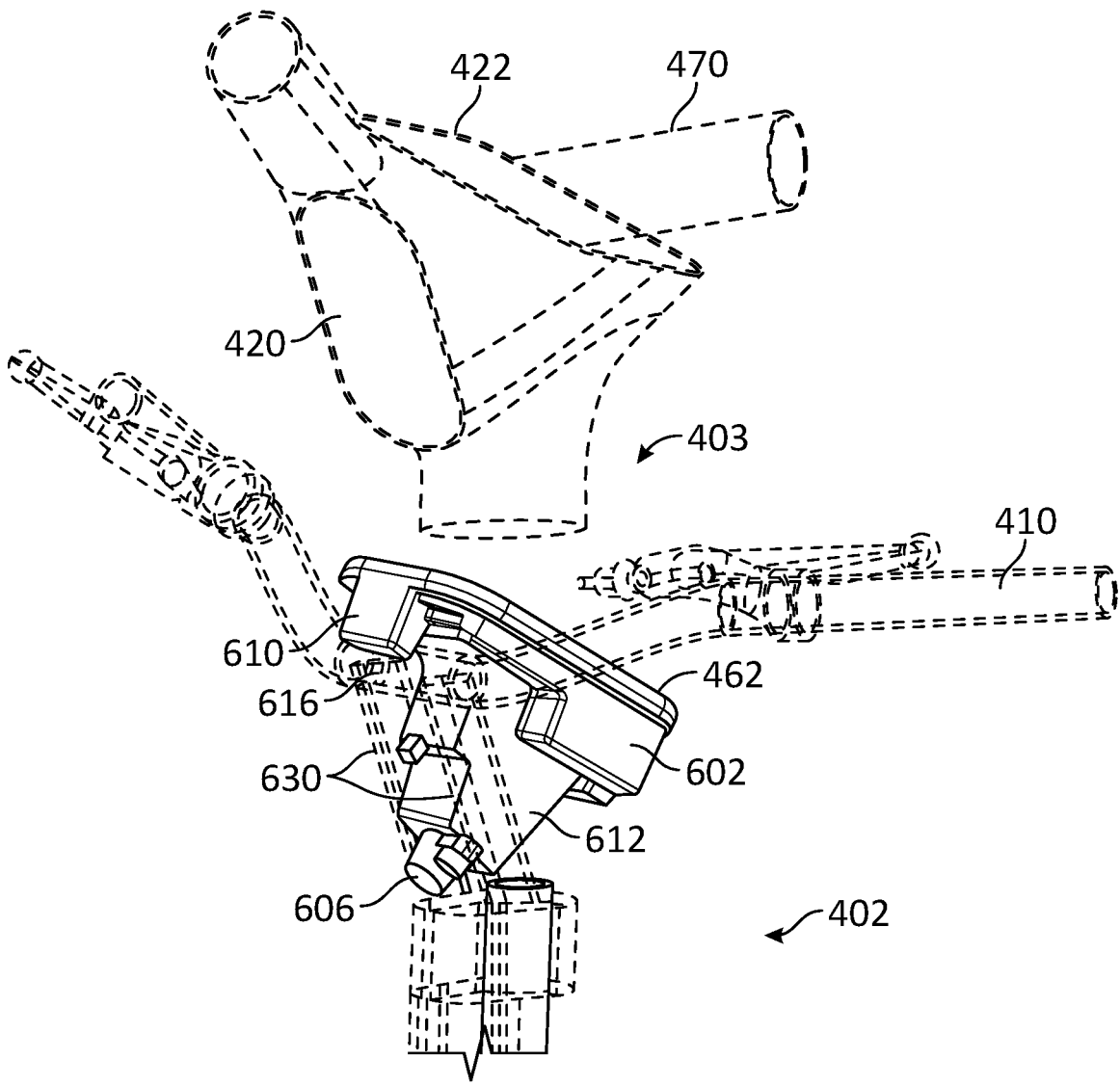

FIG. 6B illustrates a view of the cockpit assembly 403 with the outer housing 470 of the cockpit assembly 403 removed. As shown in FIG. 6B, the second portion 612 of the cockpit housing 602 may extend from the first portion 610 between frame members 630 of the micromobility transit vehicle 402. The camera window 606 disposed between the frame members 630 may provide an unobstructed field of view for the camera 440 disposed in the second portion 612. In some embodiments, the frame members 630 may be parallel frame members of the micromobility transit vehicle 402 that couple the handlebar assembly 410 to the frame of the micromobility transit vehicle 402. The outer housing 470 may enclose the cockpit assembly 403, at least a portion of the handlebar assembly 410, and the frame members 630.

Figure 6C:
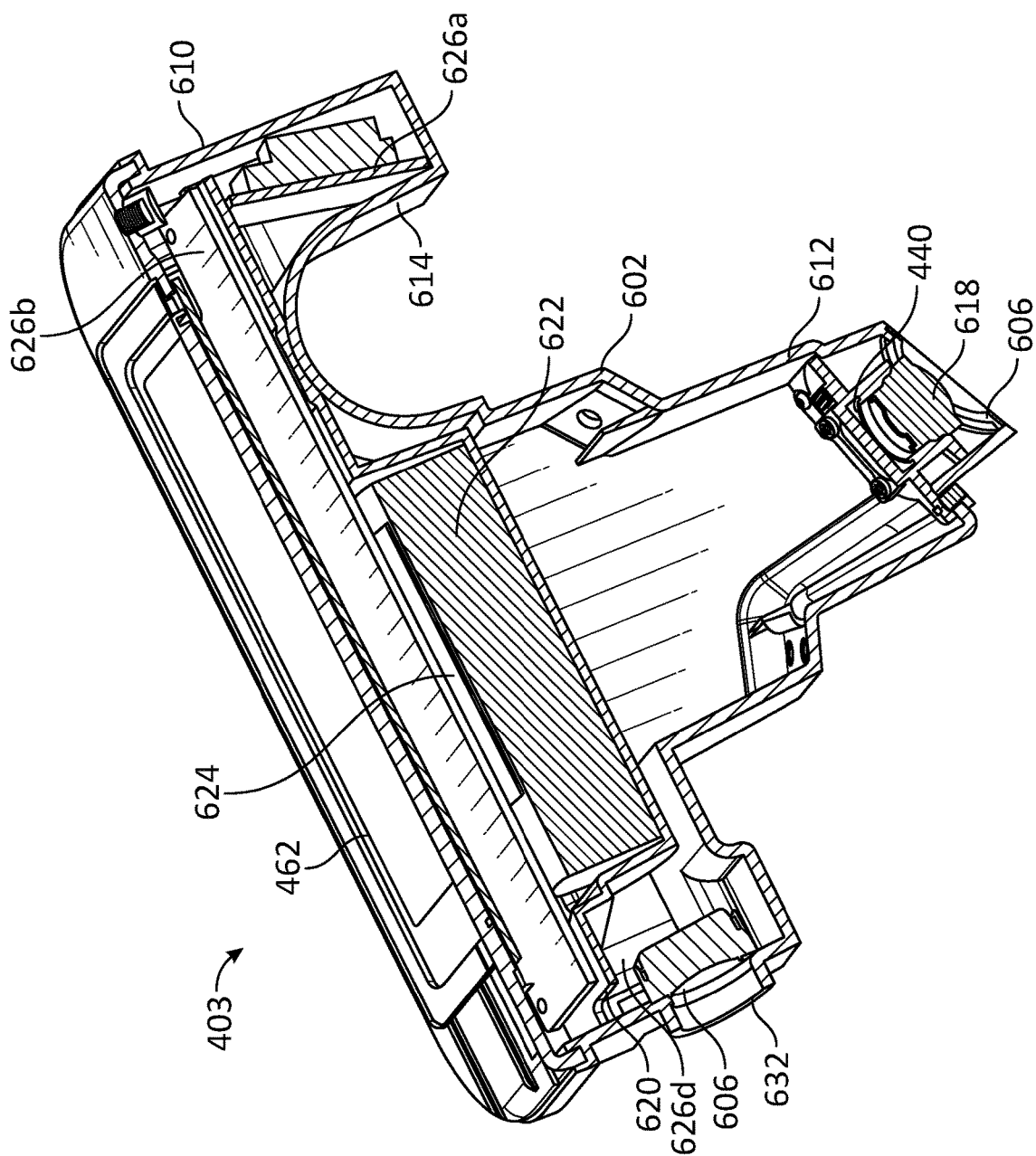

FIG. 6C illustrates a cross-sectional view of the cockpit assembly 403 in accordance with one or more embodiments of the disclosure. As shown in the embodiment of FIG. 6C, the cockpit housing 602 may have a speaker port 632 defined in the first portion 610 of the cockpit housing 602. The speaker port 632 may provide an opening for the speaker 606 to emit audible sound into an airspace about the micromobility transit vehicle 402 as described above. In some embodiments, the speaker port 632 may have a high-density mesh material that covers the speaker port 632 to prevent environmental debris from entering the speaker port 632. In some embodiments, a PCB 626d may be disposed in the first portion 610 of the cockpit housing 602 adjacent to a longitudinal side of the midframe 620. In one example, the PCB 626d may include a Long-Term Evolution (LTE) communication module that is configured to provide one or more wireless broadband communications for the micromobility transit vehicle 402 as described herein (e.g., to communicate with management system 240). In other examples, the PCB 626d may be one of wireless communication modules 120 of FIG. 1.

Figure 6D:
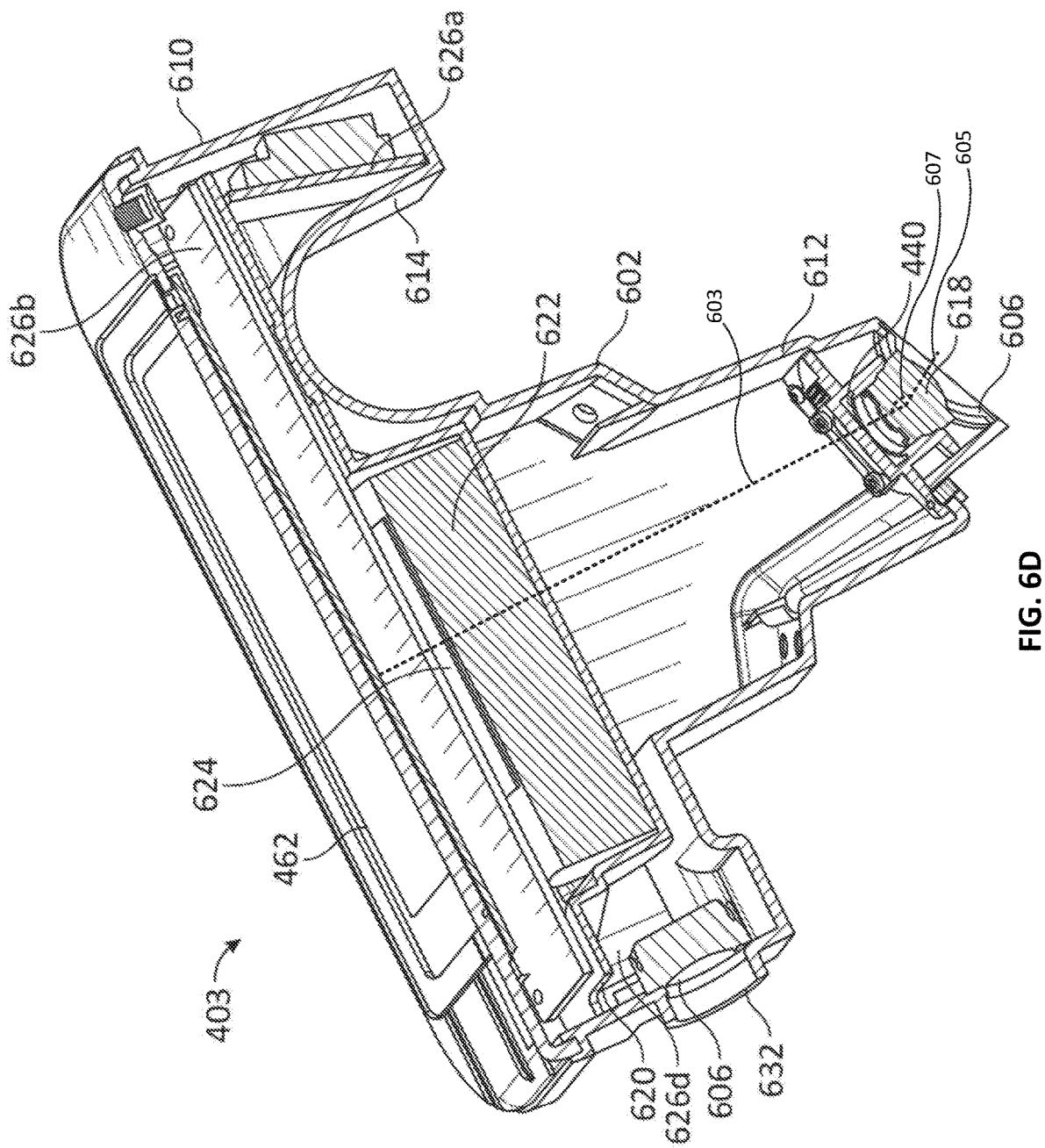

FIG. 6D illustrates the cockpit assembly of FIG. 6C with a line segment 603 between the display 462 and the camera 440 and a line segment 605 representing a central line of sight for the camera 440. The camera 440 may be oriented in the cockpit housing 602 such that an angle 607 is formed between the line segment 605 relative to the line segment 603. In other words, a perpendicular line from a plane of the display 462 to the camera 440 (i.e., line segment 603) and the line segment 605 form an angle 607. The angle 607 may be adjusted to provide the camera 440 with the desired field of view through the camera window 606. In some embodiments, the angle 607 may be between 45 and 180 degrees. The angle 407 may be adjusted such that the camera 440 may capture a field of view that is different than if the camera 440 was on a parallel plane as the camera window 606. This may allow an observer to perceive the camera window 606 as facing a different direction than a direction in which the camera 440 is pointed and capturing a field of view.

Figure 6E:
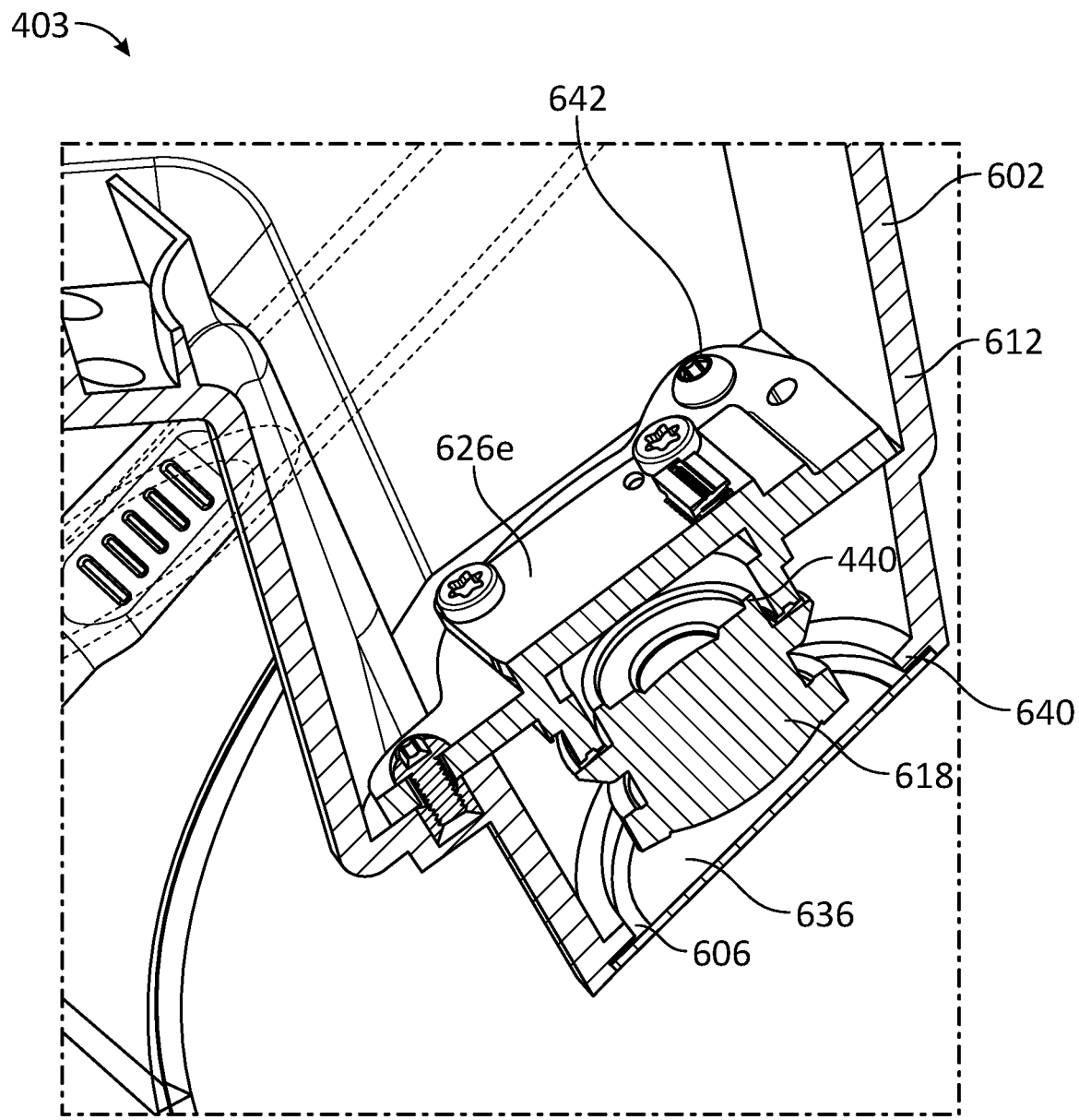

FIG. 6E illustrates a view of the camera 440 of the cockpit assembly 403 in accordance with one or more embodiments of the disclosure. As shown in FIG. 6E, the camera 440 may include a lens 618 and a PCB 626e. The lens 618 may be formed/shaped to provide a desired image of the field of view in front of the micromobility transit vehicle 402. The PCB 626e may include one or more logic devices (e.g., similar to controller 112) that can be configured to process imagery captured by detector elements of camera 440 before providing the imagery to, for example, communications module 120 or other elements of the system 100. More generally, camera 440 may be configured to perform any of the operations or methods described herein, at least in part, or in combination with controller 112 and/or user interface 113 or 132. In various implementations, the PCB 626e may be coupled to the PCB 626b via a connector such as a zero-insertion force connector. Using a zero-insertion force connector may allow for easy and convenient removal and swapping out of the camera 440 with replacement cameras between various micromobility transit vehicles.

Figure 6F:
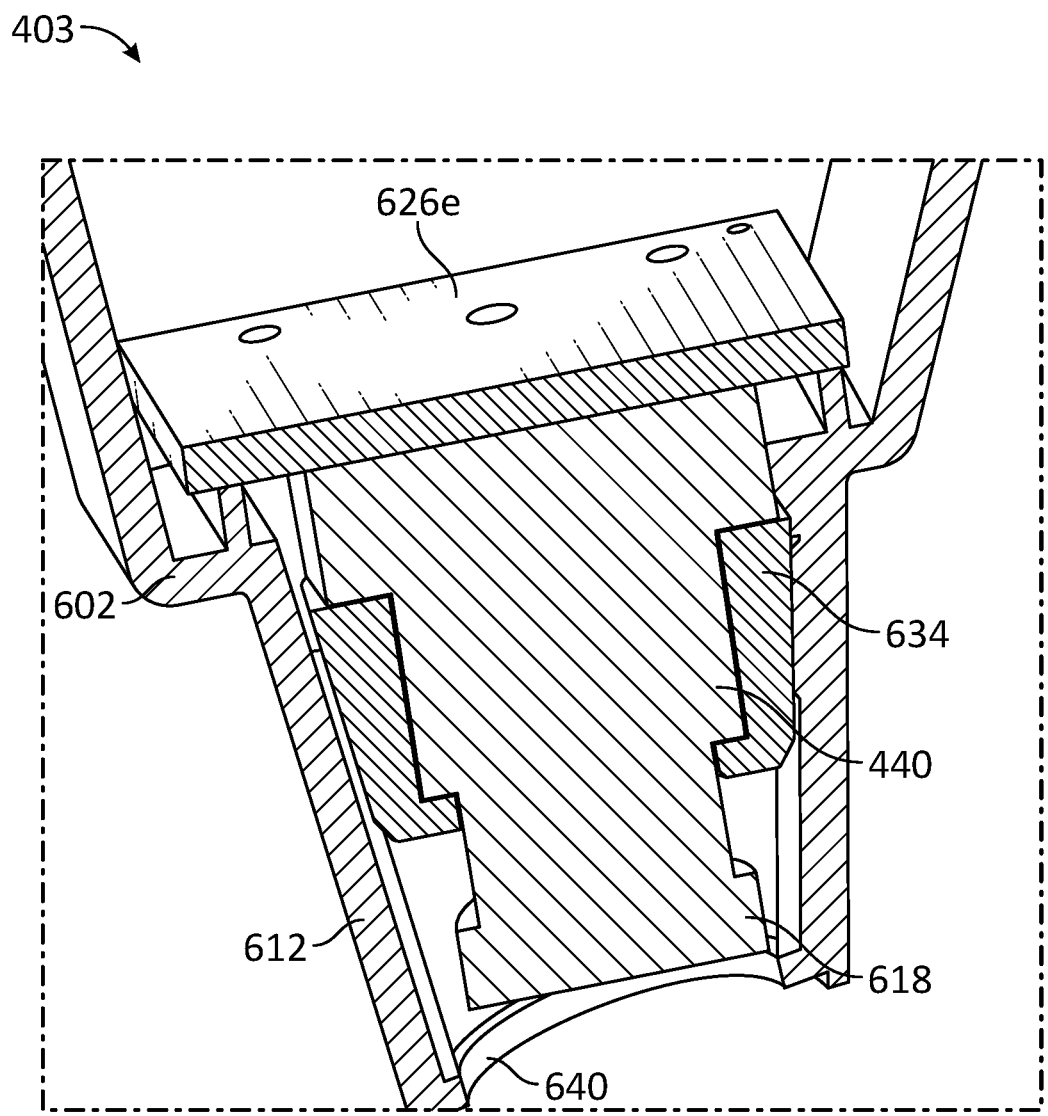

In further reference to FIG. 6E, the second portion 612 may have an interface 640 (e.g., a lip) that may be configured to receive and secure the camera window 606. The interface 640 and the camera window 606 may be coupled to form a seal such that environmental debris cannot penetrate the cockpit housing 602 at the edges of the camera window 606. Various fasteners (e.g., fastener 642) may be used to secure the camera 440 through flanges to the second portion 612 of the cockpit housing 602 and the PCB 626e to a boot 634. The boot 634 may be disposed in the second portion 612 and configured to align the camera 440 such that the camera 440 and the camera lens 618 may capture a scene in a field of view in front of the micromobility transit vehicle 402. The boot 634 may dampen vibrations and shock experienced by the camera 440 as the micromobility transit vehicle 402 travels about an environment. According to various embodiments, the boot 634 may have a shape configured to complement that of the camera 440 such that there is a secure fit of the camera 440 in the boot 634. In some embodiments, the boot 634 may be made of a material that has high energy absorption and near faultless memory. For example, a shock absorbing foam or rubber may be used to form the boot 634 in some cases. FIG. 6F illustrates a cross-sectional view of the cockpit assembly 403 in accordance with one or more embodiments of the disclosure. As shown in the embodiment of FIG. 6F, the camera 440 may be secured in the second portion 612 of the cockpit housing 602 by the boot 634.

In some embodiments, a stress cycle sensor may be attached to the camera 440. The stress cycle sensor may measure stress (e.g., vibrations or shocks, e.g., displacement, greater than a predetermined amount) that the camera 440 has experienced. A logic device (and/or controller 112 of the micromobility transit vehicle 402) of the camera 440 may process and track the number of stress cycles experienced by the camera 440 over a specified time period (e.g., lifetime, time since previous service, etc.), and when the camera 440 has experienced a certain amount of stress and/or number of stress cycles, the logic device may provide an indication of such to a user. For example, the indication may be a notification on the display 462 that the camera should be serviced. In some embodiments, the controller 112 may communicate to the management system 240 that the camera 440 may need servicing based on the current number of stress cycles. For example, various thresholds may be used to determine when the camera 440 should be serviced and when the camera 440 requires servicing. As a non-limiting, illustrative example, one threshold may be used to determine that the camera 440 should be serviced and another threshold may be used to determine that the camera 440 requires servicing to continue functional operation. In a further non-limiting example, monitoring the stress cycles may be utilized to determine that the micromobility transit vehicle 402 is being stolen and/or disassembled without permission. For example, excessive use of force such as when a user is trying to pry apart components, may be detected by the stress sensor to determine that the micromobility transit vehicle 402 is possibly being stolen or disassembled without permission. In other examples, monitoring the stress cycles may be used in determining whether the micromobility transit vehicle 402 is traveling on a smooth paved surface or a rough surface (e.g., a sidewalk as opposed to an asphalt street). When the micromobility transit vehicle 402 is detected to be traveling on a sidewalk based on the stress cycles (e.g., vibration and/or shock measured to be below a certain average threshold), the logic device may provide a reminder notice (e.g., via display or audio speaker) to the user regarding local regulations related to sidewalk use.

In further embodiments, the logic device of the camera 440 may compare image quality of the camera 440 to reference image quality (e.g., benchmark quality or images) to determine that the camera 440 should be serviced. For example, when the image quality of the camera 440 has degraded to a threshold level lower than sufficient image quality, the logic device may provide a notification to the management system 240 that the camera 440 should be serviced (e.g., via one or more communication modules and/or controllers). In further examples, subjective methods and/or objective methods may be used to assess image quality. For example, single-stimulus or double-stimulus may be used in a subjective assessment of image quality of the camera 440. In other examples, full-reference, reduced-reference, and/or no-reference techniques may be used in objective assessment of the image quality.

Figure 6G:
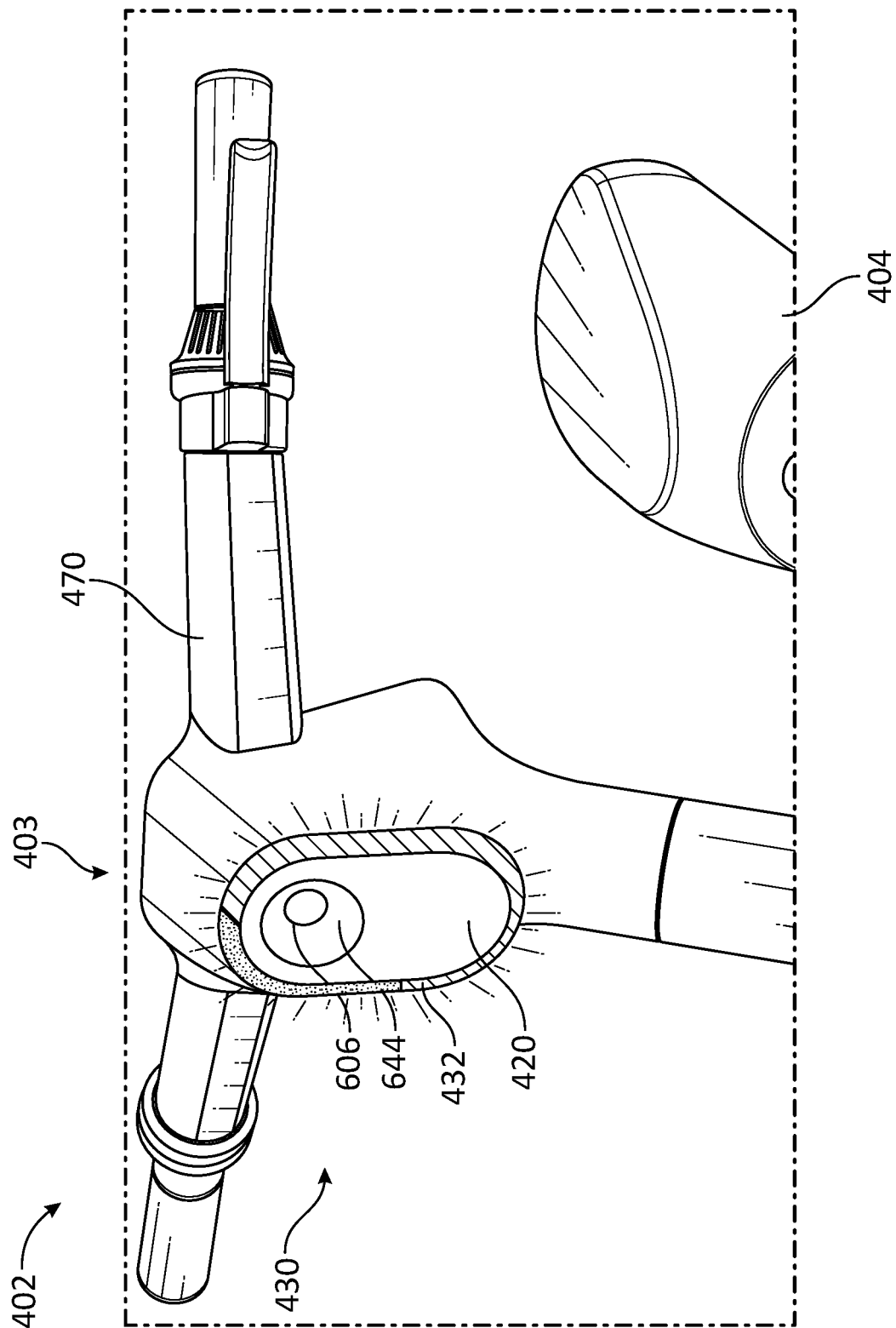

FIG. 6G illustrates the cockpit assembly 403 of the micromobility transit vehicle 402 in accordance with one or more embodiments of the present disclosure. As shown in FIG. 6G, the first face 420 may include the headlight assembly 430 and strip array 432. The camera window 606 and the camera 440 within the cockpit assembly 403 may be aligned with the illumination provided by the headlight assembly 430 (e.g., the strip array 432). Thus, the camera 440 may have sufficient and/or improved light to capture images of a field of view in front of the micromobility transit vehicle 402. In various embodiments, the headlight assembly 430 may be synced with operation of the camera 440 such that the headlight assembly 430 may adjust its illumination to provide the camera 440 with a near optimal amount of light. For example, in low-light conditions, images from the camera 440 may be evaluated by a logic device thereof and the evaluation will dictate how the headlight assembly 430 should be adjusted (e.g., more or less illumination) to improve image quality. In some embodiments, the headlight assembly 430 may operate similar the headlight assembly described in U.S. patent application Ser. No. 16/729,070, entitled "MICRO-MOBILITY FLEET VEHICLE COCKPIT ASSEMBLY SYSTEMS AND METHODS," which is incorporated herein in its entirety for all purposes.

Figure 6H:
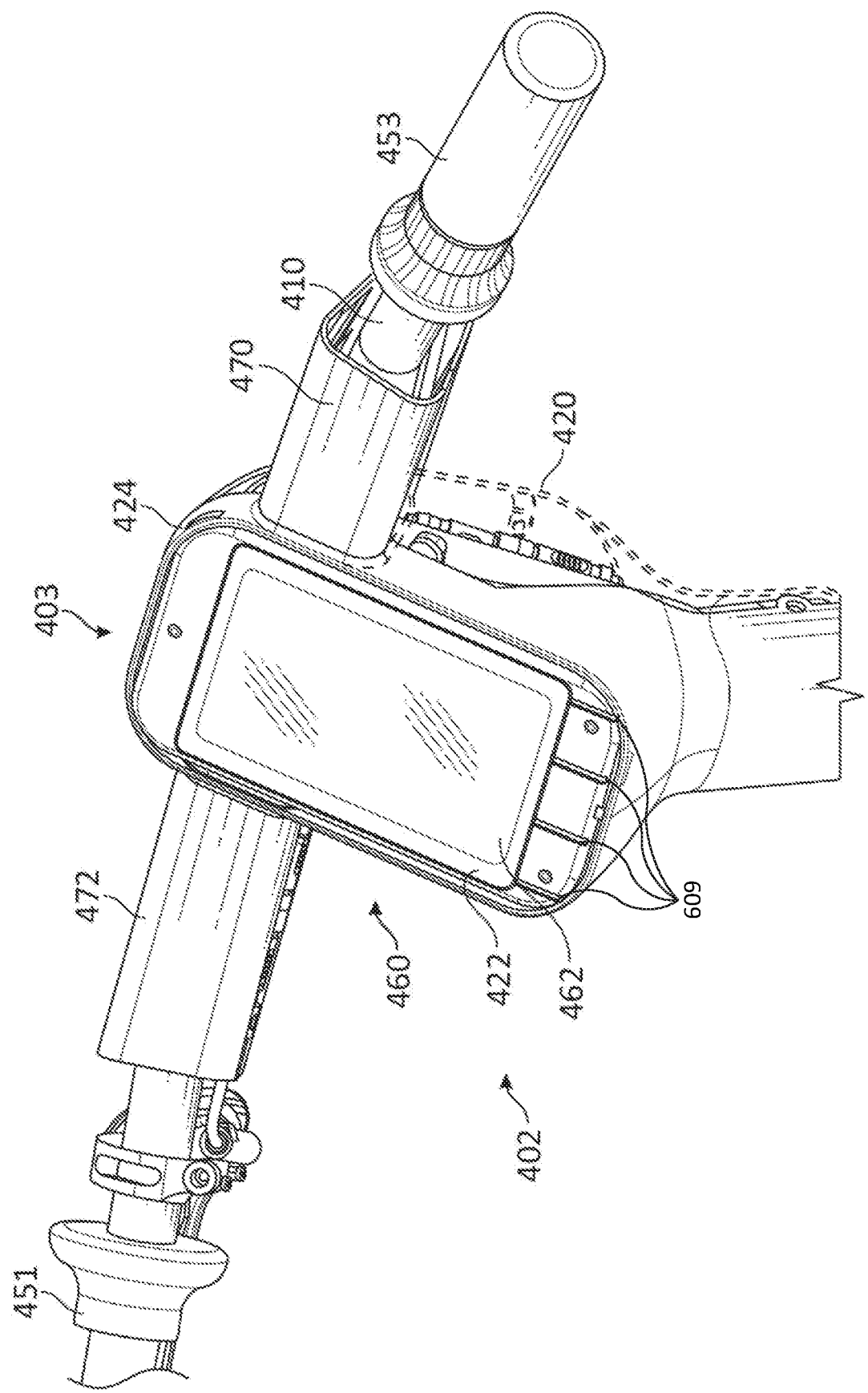
Figure 7A:
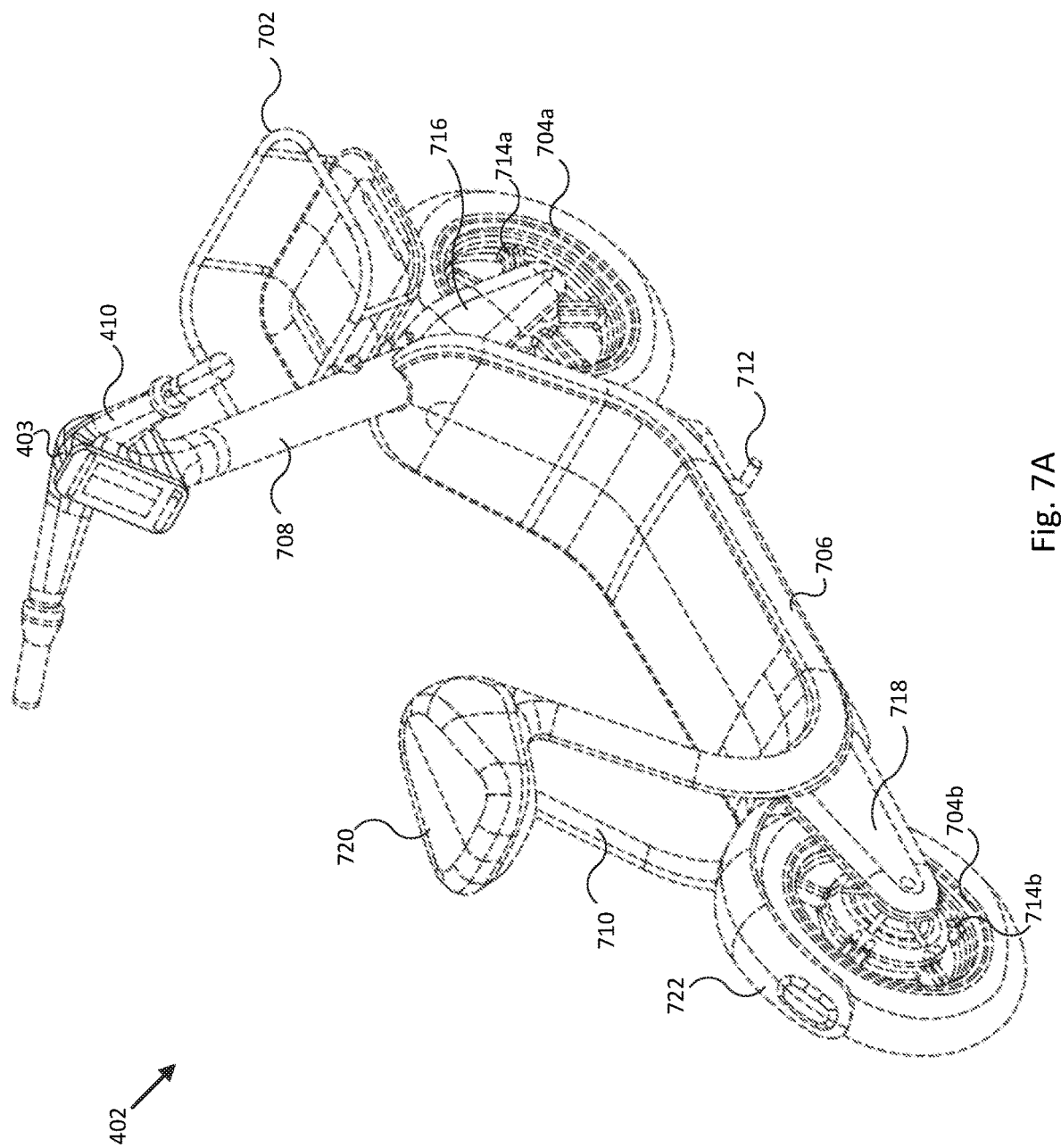
Figure 7B:
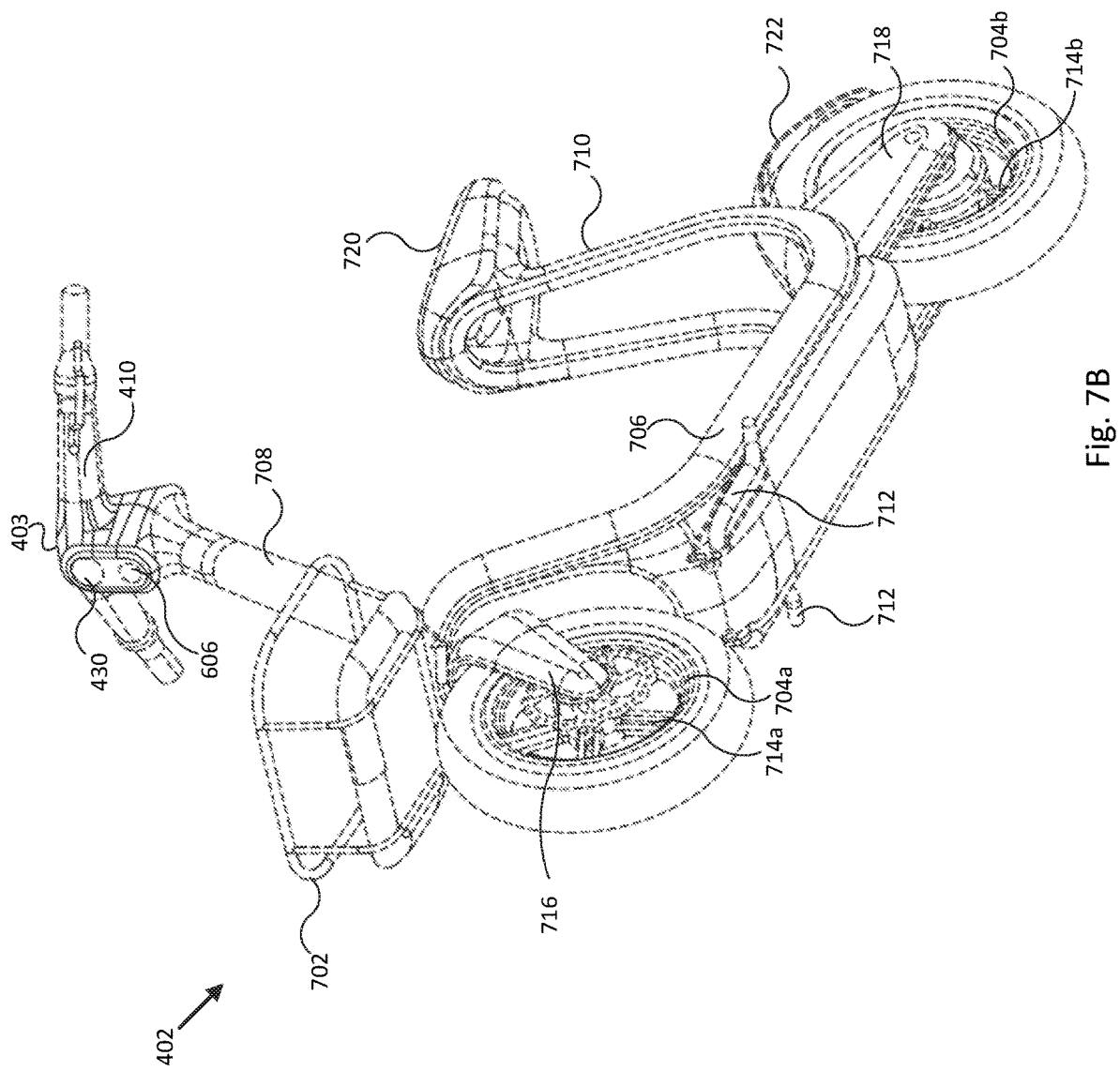
Figure 7D:
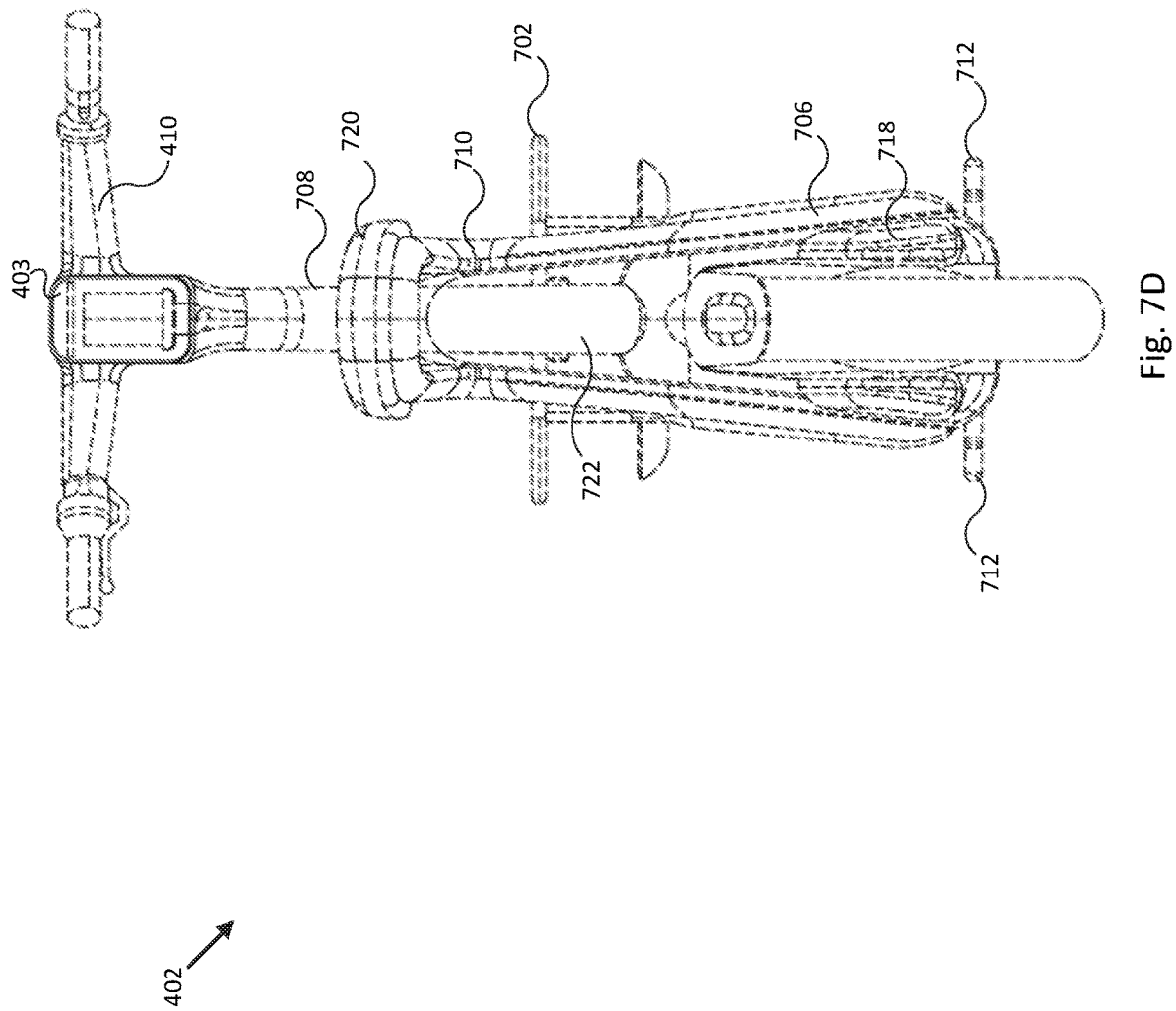
Figure 7E:
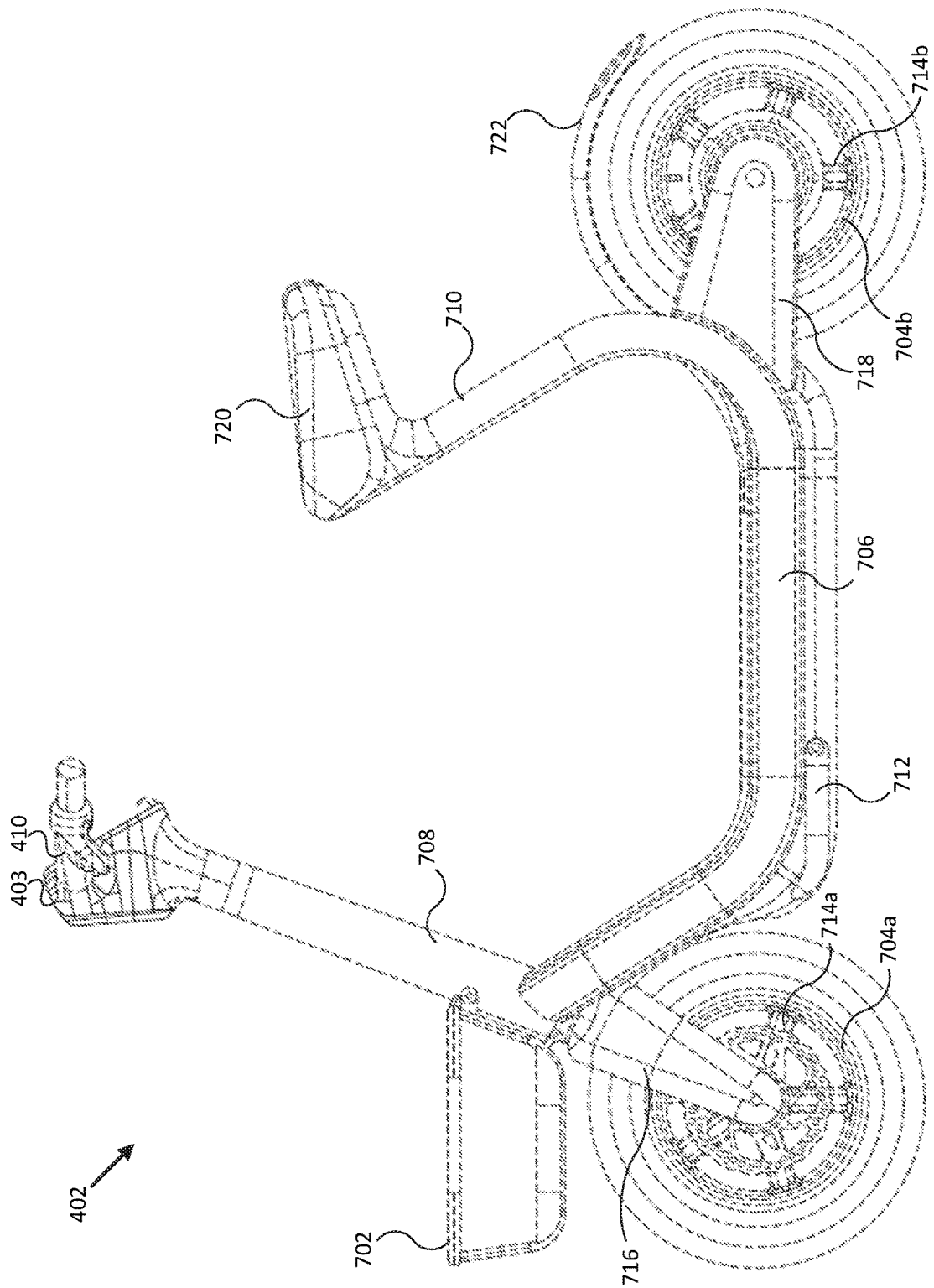
Figure 7F:
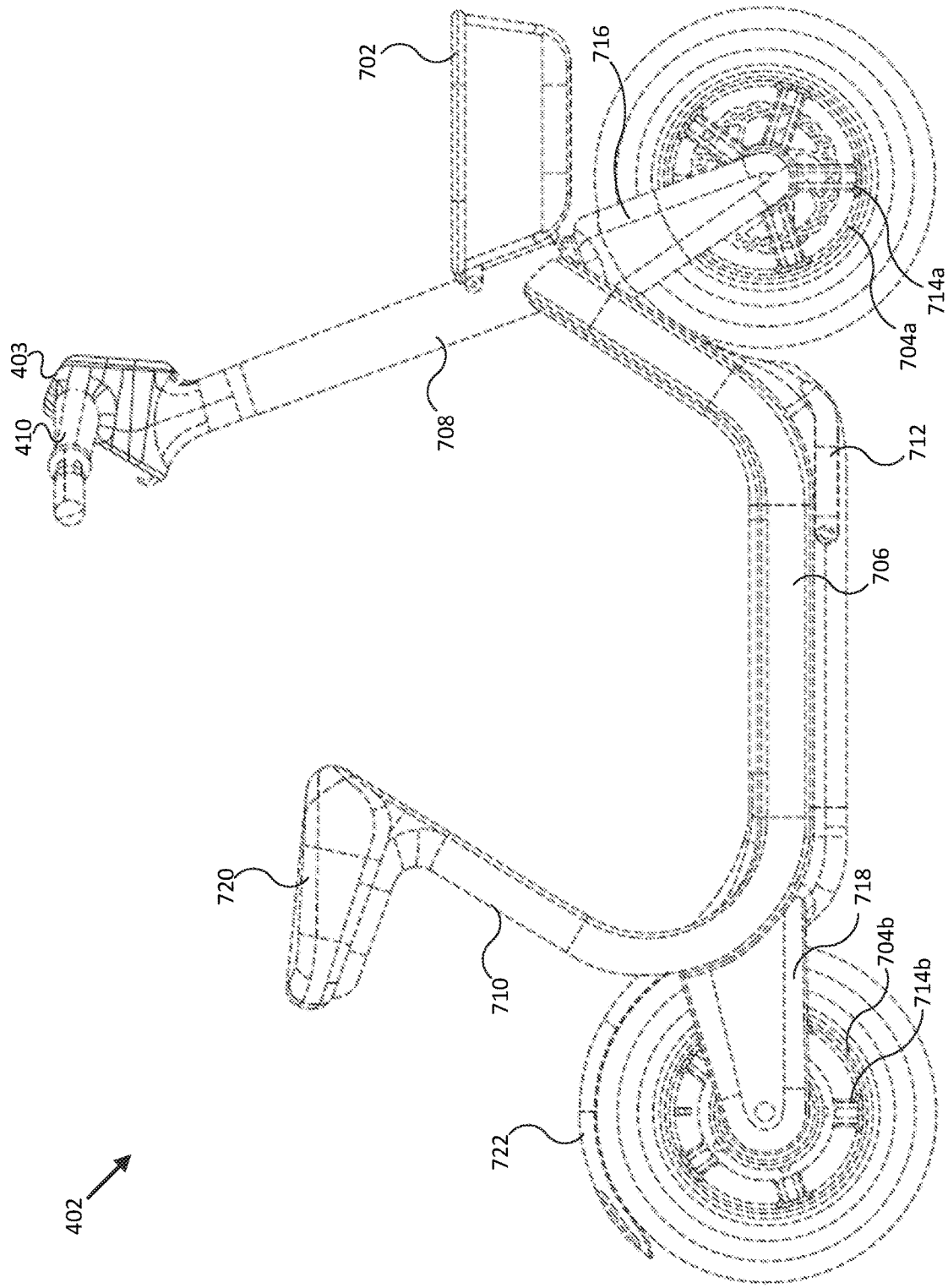
Figure 7G:
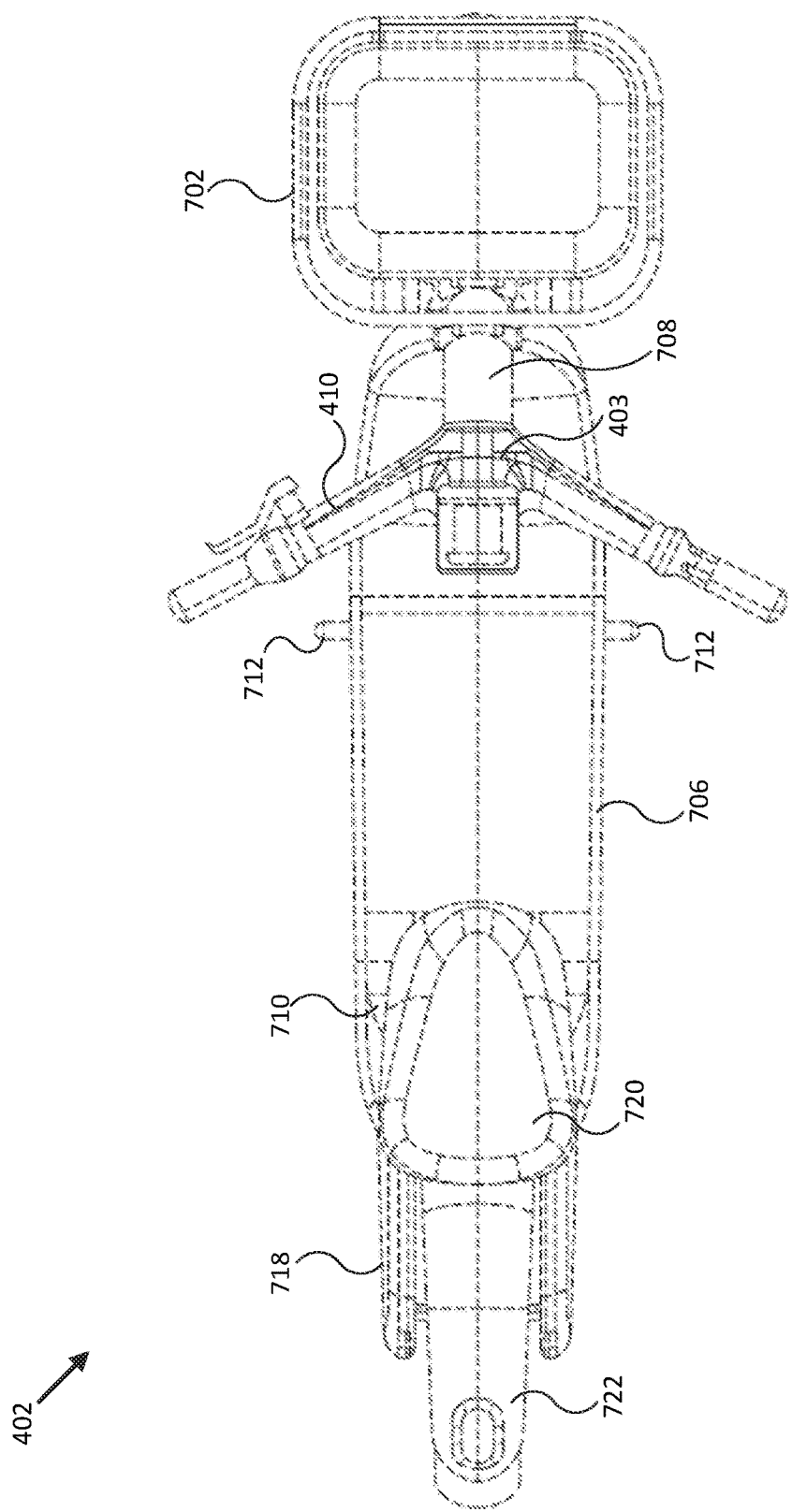
Figure 7H:
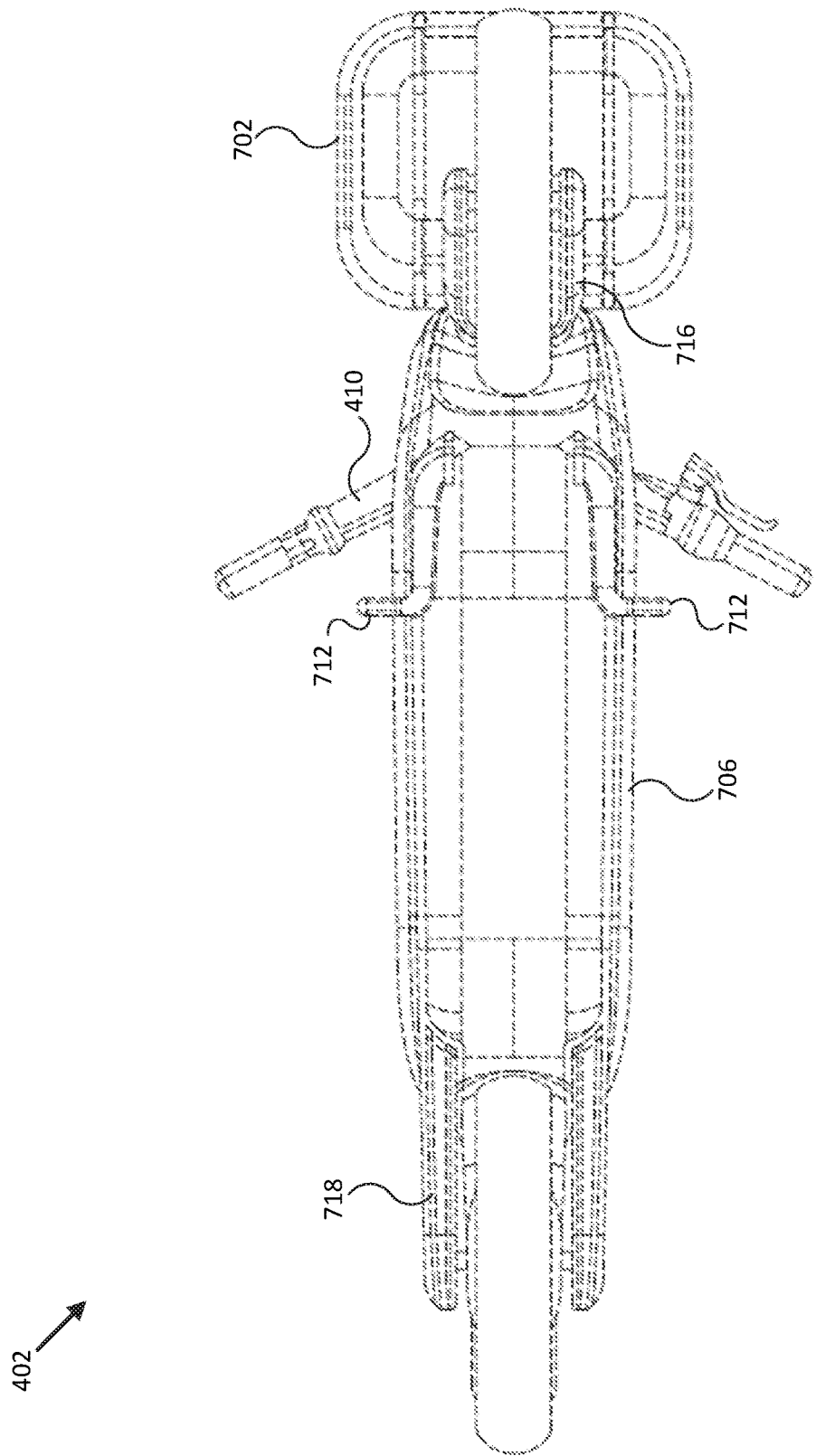
Figure 71:
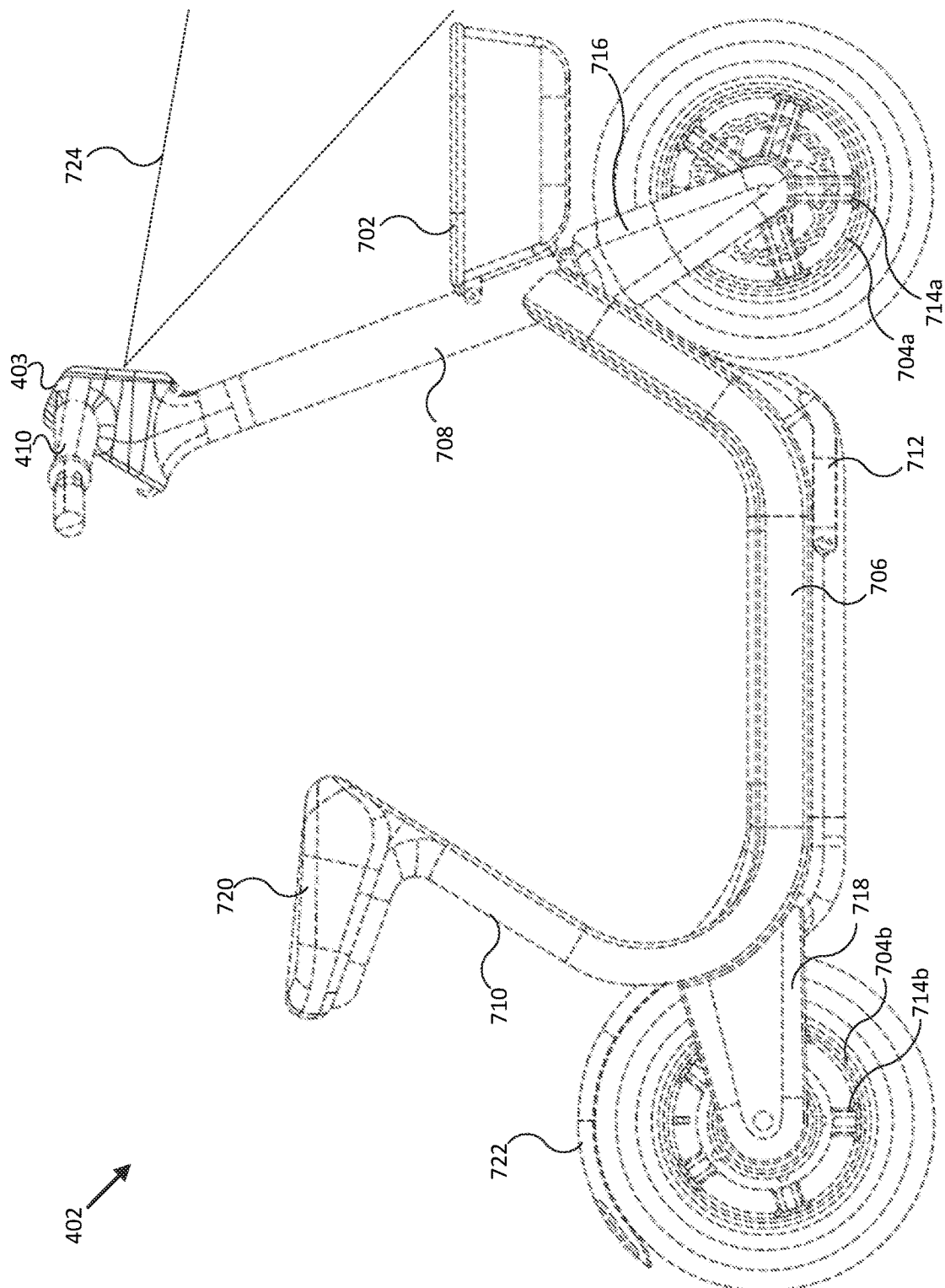

FIG. 6H illustrates a rear perspective view of the cockpit assembly 403 having a camera in accordance with an embodiment of the disclosure. The description of the embodiment of the cockpit assembly 403 described in reference to FIGS. 5D and 5E may generally apply to the embodiment shown in FIG. 6H. In the embodiment shown in FIG. 6H, the cockpit assembly 403 may have water recess channels 609 on the second face 422 (e.g., embedded in the first portion 610) adjacent to the display 462 such that water may be drained away from the display 462, for example, when the micromobility transit vehicle 402 travels through a wet environment or experiences rainfall.

FIGS. 7A-7H illustrate various views of a micromobility transit vehicle 402 in accordance with one or more embodiments of the disclosure. In the embodiments, the micromobility transit vehicle 402 includes user storage 702 (e.g., implemented as a storage basket), wheel rims 704a and 704b, wheel spokes 714a and 7114b, handle bar assembly 410, cockpit assembly 403, fork 716, kickstand 712, seat 720, fender 722, and/or frame 706. In some embodiments, frame 706 may include head tube 708, seat post/supports 710, and/or rear wheel stay 718. FIG. 7I illustrates the micromobility transit vehicle 402 in which the camera 440 (not shown in FIG. 7I) may be oriented within the cockpit assembly 403 (a cockpit housing) to have a field of view 724 in front of the micromobility transit vehicle 402 to capture a scene in the field of view 724 during operation. In some embodiments, the scene may be captured as image or video data representing a real-world still or moving scene in the field of view 724. It is noted that in some embodiments, the camera 440 may be oriented such that the field of view 724 is unobstructed by the user storage 702. The depiction of the field of view 724 is for non-limiting illustrative purposes, as the field of view 724 can have a number of different angles (e.g., horizontal, vertical, or diagonal) through which detectors of the camera 440 are sensitive to electromagnetic radiation.

Figure 8:
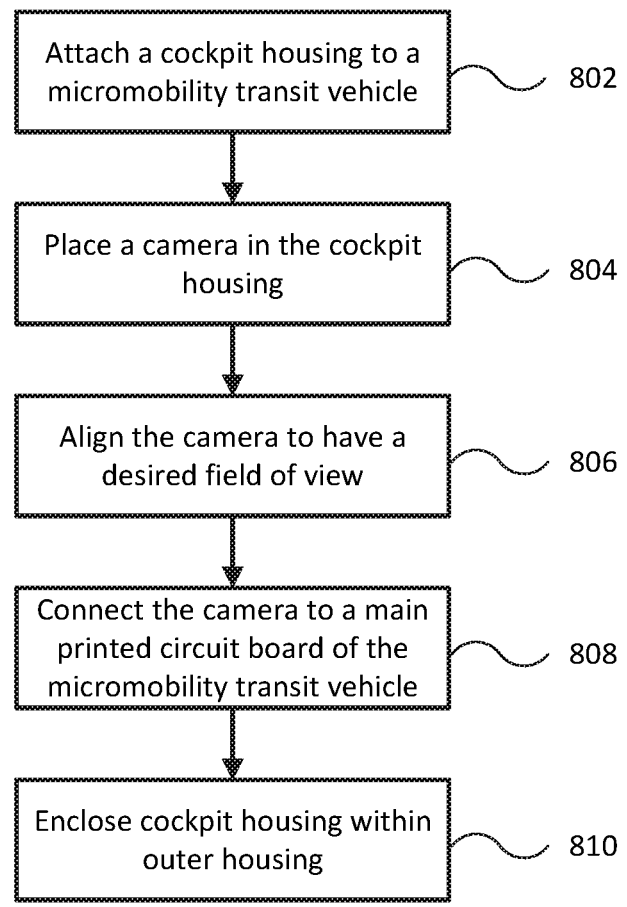
FIG. 8 illustrates a flowchart of a process for assembling a cockpit assembly in accordance with one or more embodiments of the present disclosure.

FIG. 8 illustrates a flow diagram of a process 800 of assembling a cockpit assembly 403 in accordance with an embodiment of the disclosure. It should be appreciated that any step, sub-step, sub-process, or block of process 800 may be performed in an order or arrangement different from the embodiments illustrated by FIG. 8. For example, one or more blocks may be omitted from or added to process 800. Although process 800 is described with reference to the embodiments of FIGS. 1-7I, process 800 is not limited to such embodiments.

At block 802, process 800 includes attaching the cockpit housing 602 to the handlebar assembly 410 of micromobility transit vehicle 402, described above. The cockpit housing 602 may be modular so as to easily be attached and removed from different micromobility transit vehicles, such as through a "snapping" or "quick-release" configuration. In some embodiments, the cockpit housing 602 may be attached through nuts, bolts, and/or other fastening systems, including ones that require keys or other means to remove. As shown in FIG. 6B, the cockpit housing 602 may be attached to the handlebar assembly 410 at a central stem/portion such that the second portion 612 of the cockpit housing 602 is at least partially disposed between the members 630. The surface 614 of the first portion 610 may partially wrap around the central stem/portion in some embodiments. Thus, the camera 440 disposed in the cockpit housing 602 may have a field of view 724 unobstructed by the members 630 or headtube of the micromobility transit vehicle 402.

At block 804, the camera 440 may be placed in the cockpit housing 602. For example, the camera 440 may be placed/secured in the second portion 612 of the cockpit housing 602. In some embodiments, the camera 440 may be placed in the second portion 612 of the cockpit housing 602 such that a portion of the camera 440 is exposed outside of the cockpit housing 602. For example, a main portion of the camera 440 (e.g., image sensors and/or PCB of the camera 440) may be disposed in the second portion 612 of the cockpit housing 602 while a lens 618 or other component of the camera 440 may be protruding from the second portion 612 of the cockpit housing 602. In such cases, the second portion 612 may have an opening defined therein to allow for the camera 440 to be partially exposed outside of the cockpit housing 602. In other embodiments, as discussed herein, the camera 440 may be placed in the second portion 612 such that its lens is adjacent to a camera window 606.

At block 806, the camera 440 may be aligned to capture a desired field of view 724 in front of the micromobility transit vehicle. For example, the camera 440 may be aligned to capture the field of view 724 through the camera window 606 when the camera 440 is placed in the cockpit housing 602. In some embodiments, the camera 440 may be placed in the boot 634 where the boot 634 aligns the camera 440 with a desired field of view 724. The camera 440 may be fastened to the boot 634 and/or cockpit housing 602 via one or more fasteners, pins, and/or pin slots in some embodiments. For example, as discussed in reference to FIG. 6D, there may be an angle 607 between an orthogonal line 603 from the display 462 to the camera 440 and the camera's 440 center line of sight 605. Thus, the angle 607 may provide the camera 440 with the desired field of view 724 on the first face 420 of the cockpit assembly 403 while allowing the display 462 to be oriented for convenient access for a user on the second face 422 of the cockpit assembly 403.

In some embodiments, the camera 440 may be aligned with illumination provided by a headlight in front of the micromobility transit vehicle 402 as discussed above. For example, the headlight may include a cone beam light assembly for illuminating a path ahead of the micromobility transit vehicle 402 and the camera 440 may be aligned to capture images of the path. Additionally, or alternatively, the headlight may include a strip array of light emitting elements for illuminating a path ahead and/or to the side of the micromobility transit vehicle 402. The strip array of light emitting elements may define a pill-shaped center region of the first face 420. The cone beam light assembly may be disposed within the pill-shaped center region. The headlight may be similar to headlight assembly 430, described above. The strip array may be similar to strip array 432, described above. The cone beam light assembly may be similar to cone beam light assembly 436, described above. In one aspect, the camera 440 may be disposed within the pill-shaped center region of the first face 420 as described above. The camera 440 may be disposed adjacent to the cone beam light assembly within the pill-shaped center region in some cases so that the field of view 724 captured by the camera 440 is illuminated.

At block 808, the camera 440 may be connected to a main printed circuit board of the micromobility transit vehicle 402. For example, the main printed circuit board may include a control unit (e.g., controller 112) for the micromobility transit vehicle 402. The camera 440 may be connected to the main PCB via a zero-insertion force connector. Thus, image readouts provided by the camera 440 may be utilized in operation of the micromobility transit vehicle 402 by the controller 112 as discussed herein. At block 810, the cockpit housing 602 may be enclosed within outer housing 470. For example, outer housing 470 may be joined in a "snap" together fashion or otherwise fastened such that the cockpit housing is enclosed within the outer housing 470. In various embodiments, the display 462 may be exposed from the outer housing 470 on the second face 422 of the cockpit assembly. The camera window 606 may be part of the first face 420 of the cockpit assembly in that the camera window may be embedded in the surface of the outer housing 470 on the first face 420 of the cockpit assembly.

In various embodiments, one or more of the steps of process 800 may be performed in a climate-controlled environment. For example, a space in which steps of the assembly take place may be controlled for humidity, moisture, and/or temperature to prevent damage to components of the cockpit assembly 430. According to various embodiments, the cockpit assembly 403 and various components thereof described herein are electrically and/or mechanically tested to verify proper operation, robustness, and durability. For example, the camera 440 may be tested to verify that image and video capturing functionalities as well as functions of the cockpit assembly 403 related thereto are in proper working condition. As a further example, the various components may be checked to verify that they are securely fastened within the cockpit assembly 403. It is further reiterated that the steps performed in process 800 may be rearranged to suit a desired application. For example, steps performed at block 804 may be performed prior to steps performed at block 802. It will be appreciated that embodiments of the present disclosure provide relatively low cost, reliable, and robust cockpit assemblies enabled to capture images of an environment in which a micromobility transit vehicle is located or moving.

Figure 9:
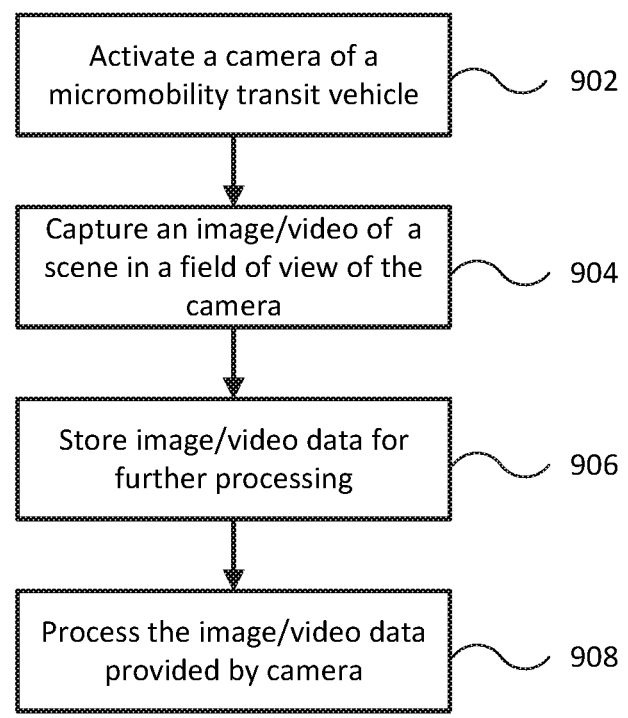
FIG. 9 illustrates a flow diagram of a process for capturing image/video of a scene in an environment using a camera of a cockpit assembly in accordance with one or more embodiments of the present disclosure.

FIG. 9 illustrates a flow diagram of a process 900 of capturing image/video of a scene in an environment using the camera 440 of the cockpit assembly 403 in accordance with one or more embodiments of the present disclosure. It should be appreciated that any step, sub-step, sub-process, or block of process 900 may be performed in an order or arrangement different from the embodiments illustrated by FIG. 9. For example, one or more blocks may be omitted from or added to the process 900. Although process 900 is described with reference to the embodiments of FIGS. 1-7I, process 900 is not limited to such embodiments. One or more of the operations described in reference to the process 900 may be performed by the various electrical and mechanical components described herein as would be understood by one of skill in the art.

At block 902, the camera 440 may be activated. For example, a user may select an option on the display 462 to enable the camera 440 to begin recording images or videos of a scene in a field of view 724 in front of the micromobility transit vehicle 402. In another example, the management system 240 may communicate with the micromobility transit vehicle 402 to activate the camera 440. In a use case, the management system 240 may receive a communication from the micromobility transit vehicle 402 indicating that the micromobility vehicle 402 is in distress, lost, being stolen, and/or detected stress cycles indicate improper use as discussed above, and in response, may send a communication to the micromobility vehicle 402 to activate the camera 440. In some embodiments, the camera 440 may automatically activate at the start/beginning of a trip for the micromobility transit vehicle 402. For example, when a user has been matched with the micromobility transit vehicle 402 and the micromobility transit vehicle 402 is unlocked or begins moving for the trip, the camera 440 may automatically activate to begin capturing image/video. Conversely, the camera 440 may be deactivated when the trip has ended such as when the management system 240 indicates the user has ended the trip, when the micromobility transit vehicle 402 has arrived at a destination of the trip, and/or the micromobility transit vehicle 402 has stopped moving for a predetermined period of time. The image/video data captured by the camera 440 may be communicated to the controller 112 and/or transmitted to the management system 240 in some instances. At block 906, the image/video data may be stored in a data storage of the micromobility transit vehicle 402 and/or the management system 240 for further processing.

At block 908, the image/video data provided by the camera 440 may be processed. For example, the image/video data may be processed for sidewalk detection similar to one or more processes described in U.S. patent application Ser. No. 16/726,156, entitled "CAMERA-SENSOR FUSION MODULE FOR SURFACE DETECTION AND FLEET VEHICLE CONTROL SYSTEMS AND METHODS," which is incorporated herein in its entirety for all purposes. In another example, the image/video data may be processed to determine if the micromobility transit vehicle 402 is operating within a designated lane such as a lane bounded by painted lines or other markings on a ground surface. In a further example, the image/video data may be processed to determine whether the camera 440 has degraded in output quality. For example, the image/video data may be compared against benchmark values to determine whether the camera 440 image/video capturing quality has degraded. In yet another example, the image/video data may be processed to determine what type of environment the micromobility transit vehicle 402 is currently in (e.g., residential neighborhood, city street, park, and so forth). In some embodiments, the operation of the micromobility transit vehicle 402 may be altered based on the determined environment. For example, if it is determined that the micromobility transit vehicle 402 is operating in an environment crowded with pedestrians or residential neighborhood, the micromobility transit vehicle's maximum operating speed may be restricted to a certain speed.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A cockpit for a micromobility transit vehicle, the cockpit comprising:
   a camera; and
   a cockpit housing configured to couple to a handlebar of the micromobility transit vehicle, wherein at least a portion of the camera is disposed within the cockpit housing;
   wherein the cockpit housing comprises:
      a first portion configured to wrap at least partially around the handlebar; and
      a second portion extending from the first portion and configured to secure the camera disposed therein such that the camera is oriented to have a field of view in front of the micromobility transit vehicle and configured to capture a scene in the field of view in front of the micromobility transit vehicle.

2. The cockpit of claim 1, wherein:
   the second portion comprises a camera window embedded in an end of the second portion; and
   the cockpit housing further comprises a boot disposed in the second portion and configured to align the camera with the camera window to provide the camera with the field of view in front of the micromobility transit vehicle through the camera window.

3. The cockpit of claim 2, wherein:
   the boot is further configured to dampen shock and/or vibration to the camera as the micromobility transit vehicle moves about an environment; and
   the camera comprises a lens oriented to create an acute angle relative to the camera window.

4. The cockpit of claim 2, wherein the camera window includes a surface coating disposed thereon, the surface coating configured to repel environmental debris from the camera window.

5. The cockpit of claim 2, further comprising a headlight coupled to the cockpit housing and configured to illuminate the field of view in front of the micromobility transit vehicle, wherein:
the boot is configured to align the camera to have the field of view illuminated by the headlight; and
the camera is configured to capture the scene in the field of view illuminated by the headlight in front of the micromobility transit vehicle.

6. The cockpit of claim 2, further comprising:
a stress sensor coupled to the camera and configured to measure vibration experienced by the camera; and
a controller coupled to the stress sensor and configured to track a number of stress cycles for the camera based on the vibration measured by the stress sensor.

7. The cockpit of claim 1, wherein:
the first portion of the cockpit housing comprises a first end and a second end; and
the cockpit further comprises:
an audio speaker disposed at the second end of the cockpit housing and configured to output audio; and
a metal midframe disposed in the first portion and extending from the first end of the cockpit housing to the second end of the cockpit housing to provide rigidity to the cockpit housing.

8. The cockpit of claim 7, wherein:
the metal midframe forms a cavity; and
the cockpit further comprises a backup battery disposed in the cavity of the metal midframe, the backup battery configured to provide backup power to the cockpit.

9. The cockpit of claim 1, further comprising a display embedded in the first portion and facing a direction substantially opposite of the field of view of the camera, wherein the display is configured to provide a user interface.

10. The cockpit of claim 9, wherein the first portion includes water recess channels adjacent to the display and configured to direct water away from the display.

11. The cockpit of claim 1, further comprising a printed circuit board disposed in the cockpit housing, wherein:
the printed circuit board includes a controller disposed thereon; and
the camera is electrically coupled to the printed circuit board via a zero insertion force flex cable to enable the controller to automatically activate the camera when the micromobility transit vehicle begins a trip.

12. A micromobility transit vehicle comprising:
a handlebar; and
a cockpit coupled to the handlebar, the cockpit comprising:
a camera; and
a cockpit housing configured to couple to the handlebar, wherein at least a portion of the camera is disposed within the cockpit housing;
wherein the cockpit housing comprises:
a first portion configured to couple the cockpit housing to the handlebar; and
a second portion extending from the first portion and configured to secure the camera disposed therein such that the camera is oriented to have a field of view in front of the micromobility transit vehicle and configured to capture a scene in the field of view in front of the micromobility transit vehicle.

13. The micromobility transit vehicle of claim 12, wherein:
the second portion comprises a camera window disposed at an end of the second portion; and
the cockpit housing further comprises a boot disposed in the second portion and configured to align the camera with the camera window to provide the camera with the field of view in front of the micromobility transit vehicle.

14. The micromobility transit vehicle of claim 13, wherein the boot is further configured to dampen shock and/or vibration to the camera as the micromobility transit vehicle moves about an environment.

15. The micromobility transit vehicle of claim 13, wherein:
the camera window includes a surface coating disposed thereon; and
the surface coating is configured to repel environmental debris from the camera window.

16. The micromobility transit vehicle of claim 13, further comprising a headlight configured to illuminate the field of view in front of the micromobility transit vehicle, wherein:
the boot is configured to align the camera with an illumination provided by the headlight of the field of view; and
the camera is configured to capture the scene in the field of view illuminated in front of the micromobility transit vehicle.

17. The micromobility transit vehicle of claim 13, further comprising:
a stress sensor coupled to the camera and configured to measure vibration experienced by the camera as the micromobility transit vehicle moves about an environment; and
a controller coupled to the stress sensor and configured to track a number of stress cycles for the camera based on the measured vibration.

18. The micromobility transit vehicle of claim 12, wherein:
the first portion comprises a first end and a second end;
the first end is configured to wrap at least partially around the handlebar; and
the cockpit further comprises an audio speaker disposed in the second end of the first portion and configured to output audible notifications.

19. A method for assembling a cockpit for a micromobility transit vehicle, the method comprising:
attaching a cockpit housing to the micromobility transit vehicle; and
placing a camera in the cockpit housing, wherein:
the cockpit housing is configured to couple to a handlebar of the micromobility transit vehicle; and
the cockpit housing comprises:
a first portion configured to wrap at least partially around the handlebar; and
a second portion extending from the first portion and configured to secure the camera disposed therein such that the camera is oriented to have a field of view in front of the micromobility transit vehicle and configured to capture a scene in the field of view in front of the micromobility transit vehicle.

20. The method of claim 19, further comprising aligning the camera with a headlight of the micromobility transit vehicle such that the headlight illuminates the scene in the field of view in front of the micromobility transit vehicle.

* * * * *